(12) United States Patent  
Keating et al.

(10) Patent No.: US 9,087,403 B2  
(45) Date of Patent: Jul. 21, 2015

(54) MAINTAINING CONTINUITY OF AUGMENTATIONS

(71) Applicant: QUALCOMM Incorporated, San Diego, CA (US)

(72) Inventors: Virginia Walker Keating, San Diego, CA (US); Michael Gervautz, Vienna (AT); Per O. Nielsen, Chula Vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 13/844,756

(22) Filed: Mar. 15, 2013

(65) Prior Publication Data

US 2014/0028714 A1  Jan. 30, 2014

Related U.S. Application Data

(60) Provisional application No. 61/676,246, filed on Jul. 26, 2012, provisional application No. 61/676,249, filed on Jul. 26, 2012, provisional application No. 61/676,278, filed on Jul. 26, 2012, provisional application No. 61/676,255, filed on Jul. 26, 2012, provisional application No. 61/676,274, filed on Jul. 26, 2012.

(51) Int. Cl.
*G09G 5/14* (2006.01)
*G06T 19/00* (2011.01)
(Continued)

(52) U.S. Cl.
CPC ............... *G06T 19/006* (2013.01); *A63F 13/00* (2013.01); *G06F 3/005* (2013.01); *G06F 3/01* (2013.01); *G06F 3/011* (2013.01); *G06F 3/0304* (2013.01);
(Continued)

(58) Field of Classification Search
CPC ...................................................... G06T 19/006
USPC ......................................................... 345/633
See application file for complete search history.

(56) References Cited

U.S. PATENT DOCUMENTS 5,588,139 A    12/1996  Lanier et al.
6,175,954 B1    1/2001  Nelson et al.
(Continued)

FOREIGN PATENT DOCUMENTS

CN    102402842 A    4/2012
EP       2105179 A1    9/2009
(Continued)

OTHER PUBLICATIONS

Kurz, D., et al., "Handheld Augmented Reality involving gravity measurements," Munich Germany, vol. 36, No. 7, Nov. 2012, pp. 866-883.

(Continued)

*Primary Examiner* — Javid A Amini
(74) *Attorney, Agent, or Firm* — Silicon Valley Patent Group LLP

(57) ABSTRACT

Methods and apparatuses for maintaining continuity of augmentations are disclosed. In one embodiment, a method for use with an augmented reality enabled device (ARD) comprises tracking a plurality of objects and a background based at least in part on visual information derived from an image, maintaining states of the plurality of objects based at least in part on information other than the visual information, and providing data for rendering augmentation in response to the states of the plurality of objects.

42 Claims, 9 Drawing Sheets

(51) Int. Cl.

| | | |
|---|---|---|
| H04N 7/18 | (2006.01) | |
| H04N 21/41 | (2011.01) | |
| H04N 21/422 | (2011.01) | |
| H04N 21/482 | (2011.01) | |
| H04N 21/485 | (2011.01) | |
| G06T 7/20 | (2006.01) | |
| G06F 3/00 | (2006.01) | |
| G06F 3/01 | (2006.01) | |
| G06F 3/03 | (2006.01) | |
| G06K 9/00 | (2006.01) | |
| G06K 9/46 | (2006.01) | |
| A63F 13/00 | (2014.01) | |

(52) U.S. Cl.
CPC ........ *G06K 9/00201* (2013.01); *G06K 9/00671* (2013.01); *G06K 9/4671* (2013.01); *G06T 7/2033* (2013.01); *H04N 7/185* (2013.01); *H04N 21/4126* (2013.01); *H04N 21/42208* (2013.01); *H04N 21/42224* (2013.01); *H04N 21/482* (2013.01); *H04N 21/4852* (2013.01); *A63F 2300/105* (2013.01); *A63F 2300/1075* (2013.01); *A63F 2300/1087* (2013.01); *A63F 2300/405* (2013.01); *A63F 2300/69* (2013.01); *A63F 2300/8082* (2013.01)

(56) References Cited

U.S. PATENT DOCUMENTS

| | | | |
|---|---|---|---|
| 6,616,454 | B2 | 9/2003 | Ebersole et al. |
| 7,050,078 | B2 | 5/2006 | Dempski |
| 7,536,030 | B2 | 5/2009 | Wang et al. |
| 7,724,258 | B2 | 5/2010 | Ebert et al. |
| 7,768,534 | B2 * | 8/2010 | Pentenrieder et al. ........ 345/633 |
| 7,774,044 | B2 * | 8/2010 | Sauer et al. .................... 600/424 |
| 7,777,642 | B2 | 8/2010 | Kim et al. |
| 8,264,505 | B2 | 9/2012 | Bathiche et al. |
| 8,314,815 | B2 | 11/2012 | Navab et al. |
| 8,358,320 | B2 * | 1/2013 | Zhou et al. ..................... 345/632 |
| 8,928,796 | B2 | 1/2015 | Van Heugten et al. |
| 2004/0145594 | A1 | 7/2004 | Kobayashi et al. |
| 2004/0193413 | A1 | 9/2004 | Wilson et al. |
| 2006/0184003 | A1 * | 8/2006 | Lewin et al. ................... 600/414 |
| 2007/0222746 | A1 | 9/2007 | LeVine |
| 2008/0225041 | A1 * | 9/2008 | El Dokor et al. ............. 345/419 |
| 2010/0001998 | A1 | 1/2010 | Mandella et al. |
| 2010/0013860 | A1 | 1/2010 | Mandella et al. |
| 2010/0030578 | A1 | 2/2010 | Siddique et al. |
| 2010/0086218 | A1 | 4/2010 | Tateno |
| 2010/0150404 | A1 | 6/2010 | Marks et al. |
| 2011/0021180 | A1 | 1/2011 | Ray |
| 2011/0138416 | A1 | 6/2011 | Kang et al. |
| 2011/0164163 | A1 | 7/2011 | Bilbrey et al. |
| 2011/0187527 | A1 * | 8/2011 | Goodwill et al. ........ 340/539.13 |
| 2011/0310227 | A1 | 12/2011 | Konertz et al. |
| 2011/0316845 | A1 * | 12/2011 | Roberts et al. ................. 345/419 |
| 2012/0026192 | A1 | 2/2012 | Lim |
| 2012/0038549 | A1 | 2/2012 | Mandella et al. |
| 2012/0057032 | A1 | 3/2012 | Jang et al. |
| 2012/0075168 | A1 | 3/2012 | Osterhout et al. |
| 2012/0075343 | A1 * | 3/2012 | Chen et al. .................... 345/633 |
| 2012/0087580 | A1 * | 4/2012 | Woo et al. ..................... 382/165 |
| 2012/0113223 | A1 | 5/2012 | Hilliges et al. |
| 2012/0120070 | A1 | 5/2012 | Baillot |
| 2012/0128241 | A1 | 5/2012 | Jung |
| 2012/0146998 | A1 | 6/2012 | Kim et al. |
| 2012/0151347 | A1 * | 6/2012 | McClements, IV .......... 715/716 |
| 2012/0188342 | A1 | 7/2012 | Gervautz et al. |
| 2012/0195460 | A1 | 8/2012 | Lawrence Ashok Inigo |
| 2012/0195461 | A1 | 8/2012 | Lawrence |
| 2012/0206485 | A1 | 8/2012 | Osterhout et al. |
| 2012/0243732 | A1 | 9/2012 | Swaminathan et al. |
| 2012/0244907 | A1 | 9/2012 | Athsani et al. |
| 2012/0249528 | A1 | 10/2012 | Park et al. |
| 2013/0050432 | A1 | 2/2013 | Perez et al. |
| 2013/0063560 | A1 * | 3/2013 | Roberts et al. .................... 348/46 |
| 2013/0215148 | A1 * | 8/2013 | Antonyuk et al. ............ 345/633 |
| 2013/0305437 | A1 | 11/2013 | Weller et al. |
| 2013/0314303 | A1 | 11/2013 | Osterhout et al. |
| 2014/0028712 | A1 | 1/2014 | Keating et al. |
| 2014/0028713 | A1 | 1/2014 | Keating et al. |
| 2014/0028850 | A1 | 1/2014 | Keating et al. |
| 2014/0063054 | A1 * | 3/2014 | Osterhout et al. ........... 345/633 |
| 2014/0063055 | A1 | 3/2014 | Osterhout et al. |

FOREIGN PATENT DOCUMENTS

| | | |
|---|---|---|
| EP | 2111901 A2 | 10/2009 |
| EP | 2400464 A2 | 12/2011 |
| WO | 0229711 A2 | 4/2002 |
| WO | 2007106046 A2 | 9/2007 |
| WO | 2012009789 A2 | 1/2012 |
| WO | 2012039676 A1 | 3/2012 |

OTHER PUBLICATIONS

International Search Report and Written Opinion—PCT/US2013/048674—ISA/EPO—Sep. 25, 2013.

Antoniac P., "Augmented Reality based User Interface for Mobile Applications and Services," University of Oulu, 2005, pp. 1-181,URL http://herkules.oulu.fi/isbn9514276965/isbn9514276965.pdf.

Ballagas R., et al., "The smart phone: a ubiquitous input device," IEEE Pervasive Computing, Jan.-Mar. 2006, vol. 5 (1), pp. 70-77, URL: http://ieeexplore.ieee.org/stamp/stamp.jsp?tp=&arnumber=1593574&isnumber=33539.

Billinghurst M., et al., "Collaboration with Tangible Augmented Reality Interfaces," In Proceedings of the Ninth International Conference on Human-Computer Interaction 2001, pp. 1-5, http://citeseerx.ist.psu.edu/viewdoc/download;jsessionid=5FB35F83B0215975B018353CC9850A07?doi=10.1.1.98.766&rep=rep1&type=pdf.

Billinghurst M., et al., "Tangible Augmented Reality," In ACM SIGGRAPH Asia 2008 courses (SIGGRAPH Asia), ACM, New York, NY, USA, Article 7, 2008, 10 pages, URL: http://doi.acm.org/10.1145/1508044.1508051.

Boring S., "Touch projector: mobile interaction through video," In Proceedings of the 28th international conference on Human factors in computing systems (CHI), ACM, New York, NY, USA, 2010, pp. 2287-2296, URL: http://doi.acm.org/10.1145/1753326.1753671.

Chen L.H., et al., "A remote Chinese chess game using mobile phone augmented reality," In Proceedings of the 2008 International Conference on Advances in Computer Entertainment Technology (ACE), ACM, New York, NY, USA, 2008, pp. 284-287, URL: http://doi.acm.org/10.1145/1501750.1501817.

Chen R., et al., "An Empirical Study on Tangible Augmented Reality Learning Space for Design Skill Transfer," Tsinghua Science and Technology, vol. 13 (1), 2008, pp. 13-18, URL: http://www.sciencedirect.com/science?_ob=MImg&_imagekey=B7RKT-4TX6FMS-3-1&_cdi=25731&_user=4757105&_pii=S1007021408701202&_origin=search&_coverDate=10%2F31%2F2008&_sk=999869999.8998&view=c&wchp=dGLzVtb-zSkzS&md5=cd34d81eaf65bbc2b21b95f0bc333323&ie=/sdarticle.pdf.

Choumane A., et al., "Buttonless clicking: Intuitive select and pick-release through gesture analysis," IEEE Virtual Reality Conference (VR), Mar. 20-24, 2010, pp. 67-70.

Ha T., "An empirical evaluation of virtual hand techniques for 3D object manipulation in a tangible augmented reality environment," IEEE Symposium on 3D User Interfaces (3DUI), Mar. 2010, pp. 91-98, 20-21, URL: http://www.ieeexplore.ieee.org/stamp/stamp.jsp?tp=&arnumber=5444713&isnumber=5444694.

Hachet M., et al., "3D Interaction With and From Handheld Computers," Proceedings of IEEE VR 2005 Workshops: New Directions in 3D User Interfaces, 2005, pp. 1-5, URL: http://iparla.labri.fr/publications/2005/HK05/hach.

Hansen et al "Mixed Interactions Spaces—a new interaction technique for mobile devices", Demonstrated: Tokyo, Japan, UbiComp Conference, 2005, pp. 1-2.

(56) References Cited

OTHER PUBLICATIONS

Henrysson A., et al., "Mobile phone based AR scene assembly," In Proceedings of the 4th international conference on Mobile and ubiquitous multimedia (MUM '05), ACM, New York, NY, USA, 2005, pp. 95-102, URL: http://doi.acm.org/10.1145/1149488.1149504.

Henrysson A., et al., "Virtual object manipulation using a mobile phone," In Proceedings of the 2005 international conference on Augmented tele-existence (ICAT), ACM, New York, NY, USA, 2005, pp. 164-171. http://doi.acm.org/10.1145/1152399.1152430.

Henze N., et al., "Mobile interaction with the real world," In Proceedings of the 10th international conference on Human computer interaction with mobile devices and services (MobileHCI), ACM, New York, NY, USA, 2008, pp. 563-565. http://doi.acm.org/10.1145/1409240.1409351.

Juan C., "Augmented Reality Interactive Storytelling Systems Using Tangible Cubes for Edutainment," In Proceedings of the 2008 Eighth International Conference on Advanced Learning Technologies (ICALT), IEEE Computer Society, Washington, DC, USA, 2008, pp. 233-235, http://dx.doi.org/10.1109/ICALT.2008.122.

Karayev S., "Virtual Zoom: Augemented Reality on a Mobile Device," University of Washington, Honors Thesis in Computer Science, 2009, pp. 1-18, URL: http://sergeykarayev.com/files/vz_thesis.pdf.

Katzakis N., et al., "Mobile Phones as 3-DOF Controllers: A Comparative Study," Eighth IEEE International Conference on Dependable, Autonomic and Secure Computing (DASC), Dec. 12-14, 2009, pp. 345-349, URL: http://www.ieeexplore.ieee.org/stamp/stamp.jsp?tp=arnumber=5380602&isnumber=5380134.

Kray C., "Swiss Army Knife meets Camera Phone: Tool Selection and Interaction using Visual Markers," Proceedings of Mobile Interactions with the Real World (MIRW), 2007, 4 Pages, URL: http://citeseer.ist.psu.edu/viewdoc/download?doi=10.1.1.136.4952&rep=rep1&type=pdf.

Lee, et al., "Markerless Inspection of Augemented Reality Objects Using Fingertip Tracking," International Symposium on Wearable Computer, Oct. 2007, 8 pp.

Lee, G.A. et al., "Occlusion based Interaction Methods for Tangible Augmented Reality Environments," Proceedings of the 2004 ACM SIGGRAPH International Conference on Virtual Reality Continuum and Its Applications in Industry (VRCAI '04), Jan. 1, 2004, pp. 419-426, XP55005457, 1 New York, New York, USA DOI: 10.1145/1044588.1044680. ISBN: 978-1-58-0113884-9.

Lee G.A., "Freeze-Set-Go interaction method for handheld mobile augmented reality environments," In Proceedings of the 16th ACM Symposium on Virtual Reality and Technology (VRST), ACM, New York, NY, USA, 2009, pp. 143-146, URL: http://doi.acm.org/10.1145/1643928.1643961.

Lee W., "Tarboard: Tangible augmented reality system for table-top game environment," In 2nd International Workshop on Pervasive Gaming Applications, vol. 5, 2005, 5 Pages, URL http://www.ipsi.fraunhofer.de/ambiente/pergames2005/papers_2005/PerGames2005_TARBoard_WLee.pdf.

Looser J., "An evaluation of virtual lenses for object selection in augmented reality," In Proceedings of the 5th international conference on Computer graphics and interactive techniques in Australia and Southeast Asia (GRAPHITE), ACM, New York, NY, USA, 2007, pp. 203-210. http://doi.acm.org/10.1145/1321261.1321297.

Oh S., et al., "CAMAR: Context-aware Mobile Augmented Reality in Smart Space," GIST U-VR Lab, 2009, pp. 48-51, URL: http://icserv.gist.ac.kr/mis/publications/data/2009/iwuvr-soh.pdf.

Pierce J.S., et al., "Image plane interaction techniques in 3D immersive environments," In Proceedings of the 1997 symposium on Interactive 3D graphics (I3D), ACM, New York, NY, USA, 1997, pp. 39-ff., URL: http://doi.acm.org/10.1145/253284.253303.

Reimann C., et al., "Computer Vision based Interaction Techniques for mobile Augmented Reality," pp. 1-13, URL http://citeseerx.ist.psu.edu/viewdoc/download?doi=10.1.1.101.2121&rep=rep1&type=pdf.

Reitmayr G., et al., "iOrb—Unifying Command and 3D Input for Mobile Augmented Reality," 2005, 4 Pages, URL: http://www.ims.tuwien.ac.at/publication_detail.php?ims_id=TR-188-2-2005-02.

Rohs M., "Which one is better?—information navigation techniques for spatially aware handheld displays," In Proceedings of the 8th International Conference on Multimodal Interfaces (ICMi), 2006, pp. 1-8, URL: http://citeseerx.ist.psu.edu/viewdoc/download?doi=10.1.1.128.3921&rep=rep1&type=pdf.

Sinclair P., et al., "Adapting Information Through Tangible Augmented Reality Interfaces," In UbiComp 2004, the Sixth International Confernce on Ubiquitous Computing, Sep. 2004, 2 Pages, URL: http://citeseerx.ist.psu.edu/viewdoc/download?doi=10.1.1.96.3820&rep1&type=pdf.

Slay H., et al., "Tangible user interaction using augmented reality," Australian Computer Science Communications, vol. 24 (4), Jan. 2002, pp. 13-20, http://dx.doi.org/10.1145/563997.563988.

Ulbricht C., et al., "Tangible Augmented Reality for Computer Games," Proceeding (396) Visualization, Imaging, and Image Processing, 2003, 5 Pages, URL: http://www.cg.tuwien.ac.at/~cu/tangibleAR/viipPaper.pdf.

White S., et al., "Visual Hints for Tangible Gestures in Augmented Reality," In Proceedings of the 2007 6th IEEE and ACM International Symposium on Mixed and Augmented Reality (ISMAR), IEEE Computer Society, Washington, DC, USA, 2007, pp. 1-4. http://dx.doi.org/10.1109/ISMAR.2007.4538824.

White Sean et al., "Interaction and presentation techniques for shake menus in tangible augmented reality", 8th IEEE International Symposium on Mixed and Augmented Reality (ISMAR), Oct. 19, 2009, Piscataway, NJ, USA, IEEE, pp. 39-48, XP031568946, ISBN: 978-1-4244-5390-0.

Yan Q., "Tangible User Interfaces for Augmented Reality," National University of Singapore, 2003, 144 Pages, URL https://scholarbank.nus.edu.sg/bitstream/handle/10635/14133/ThesisV2.pdf?sequence=1.

\* cited by examiner

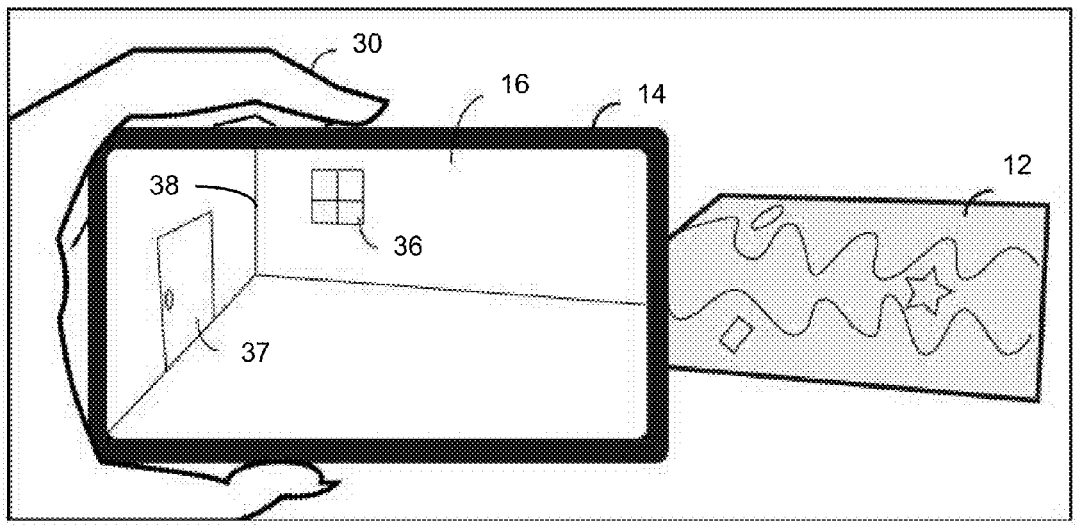
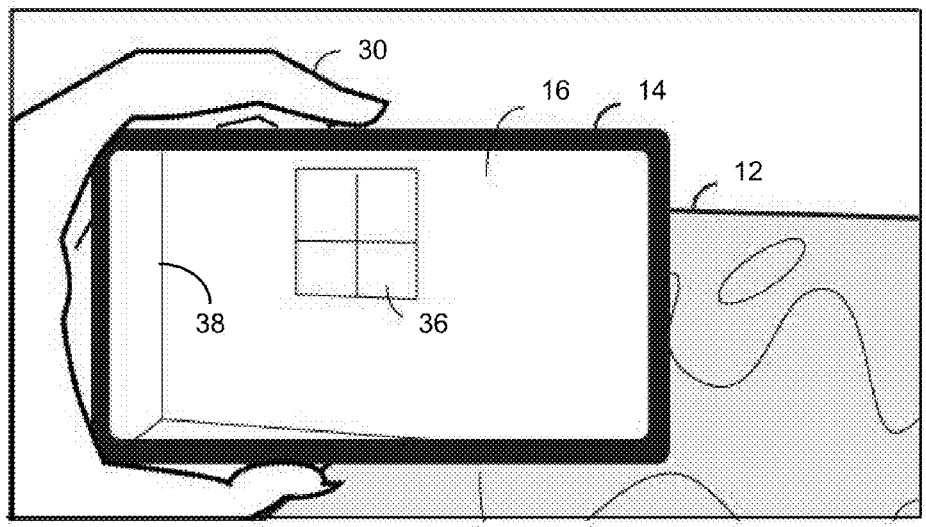
Figure 3

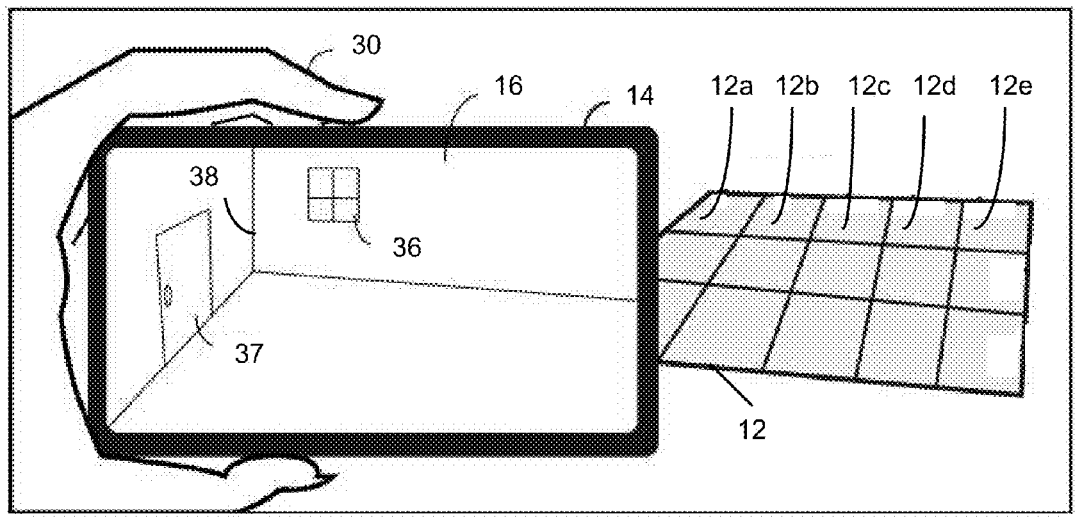
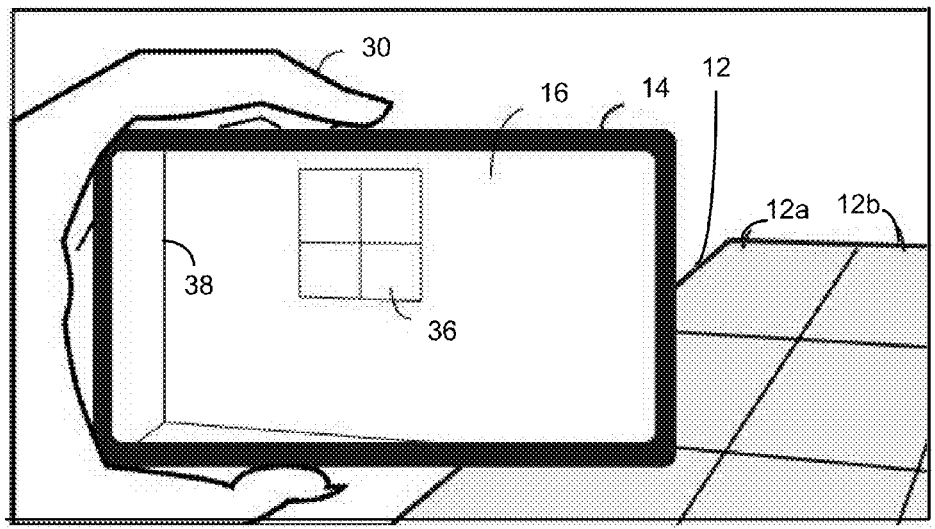
Figure 4

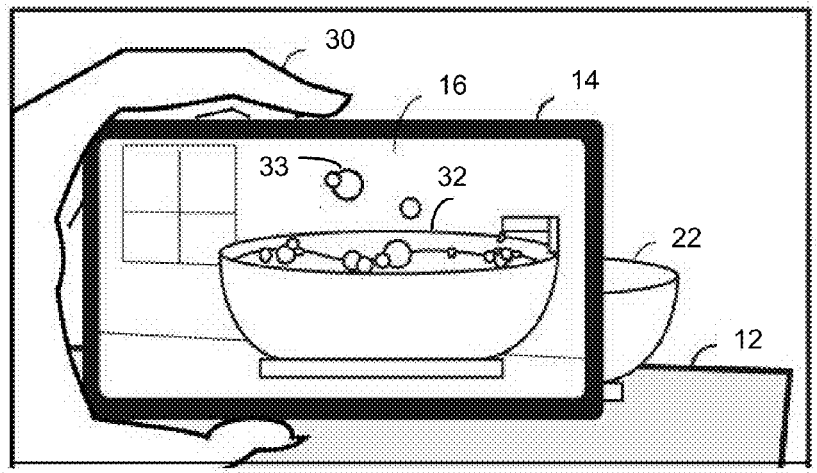
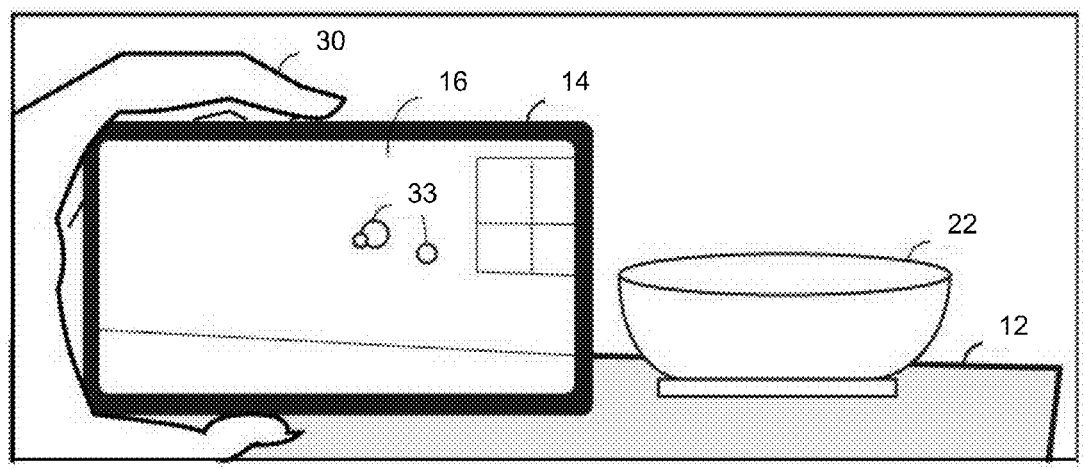
Figure 7

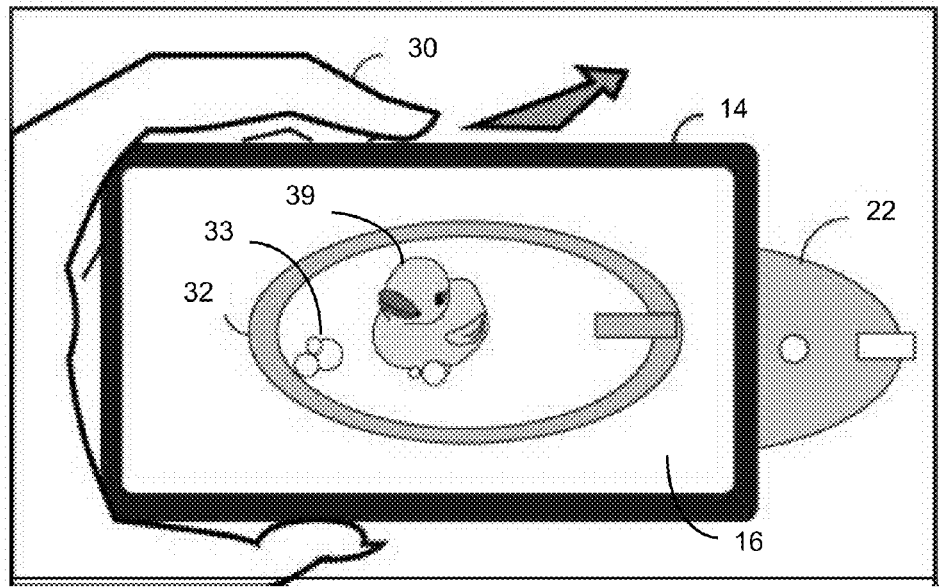
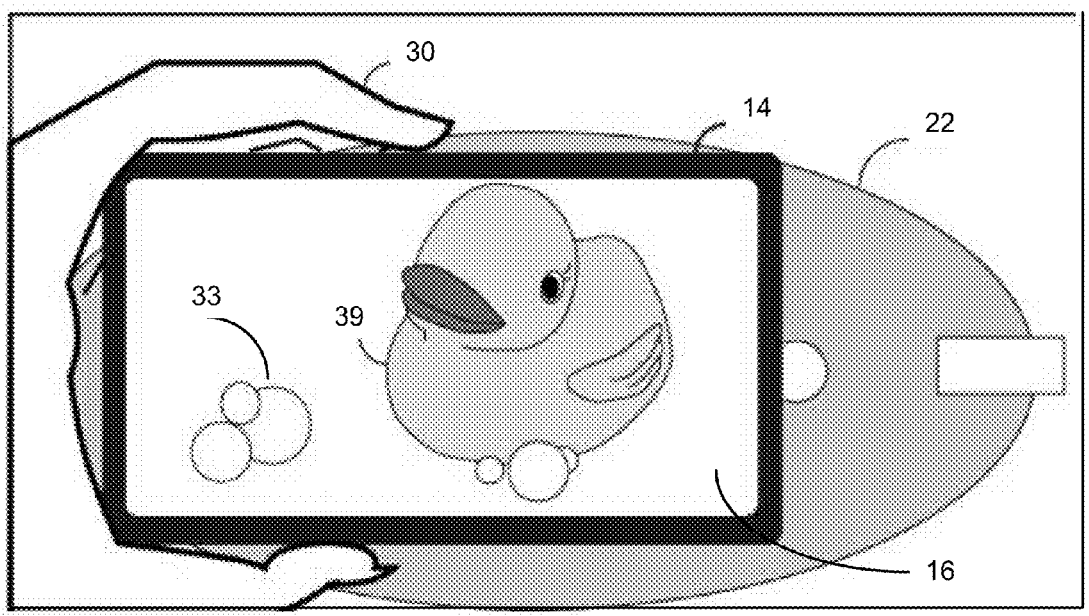
Figure 8

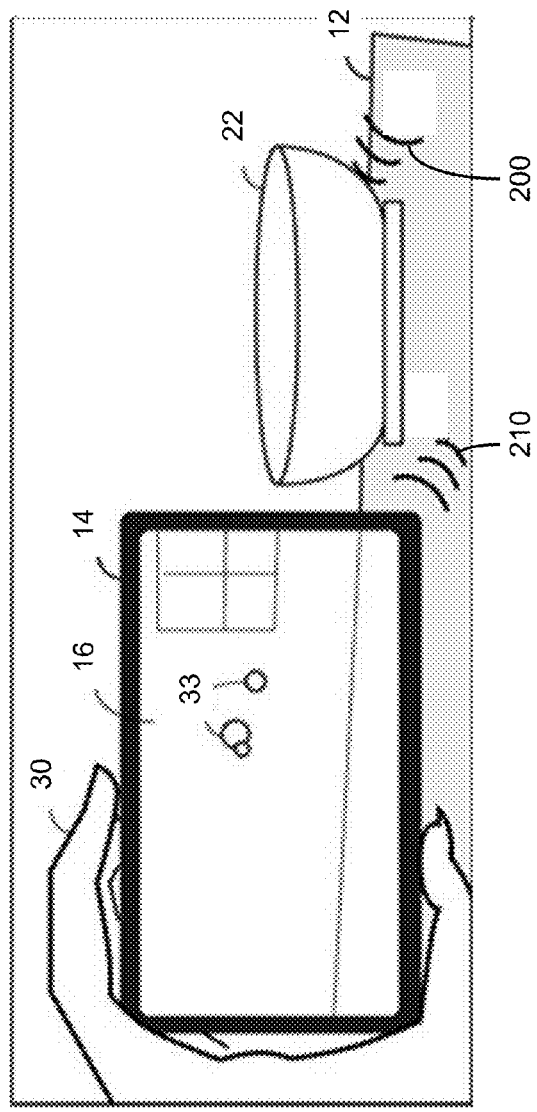
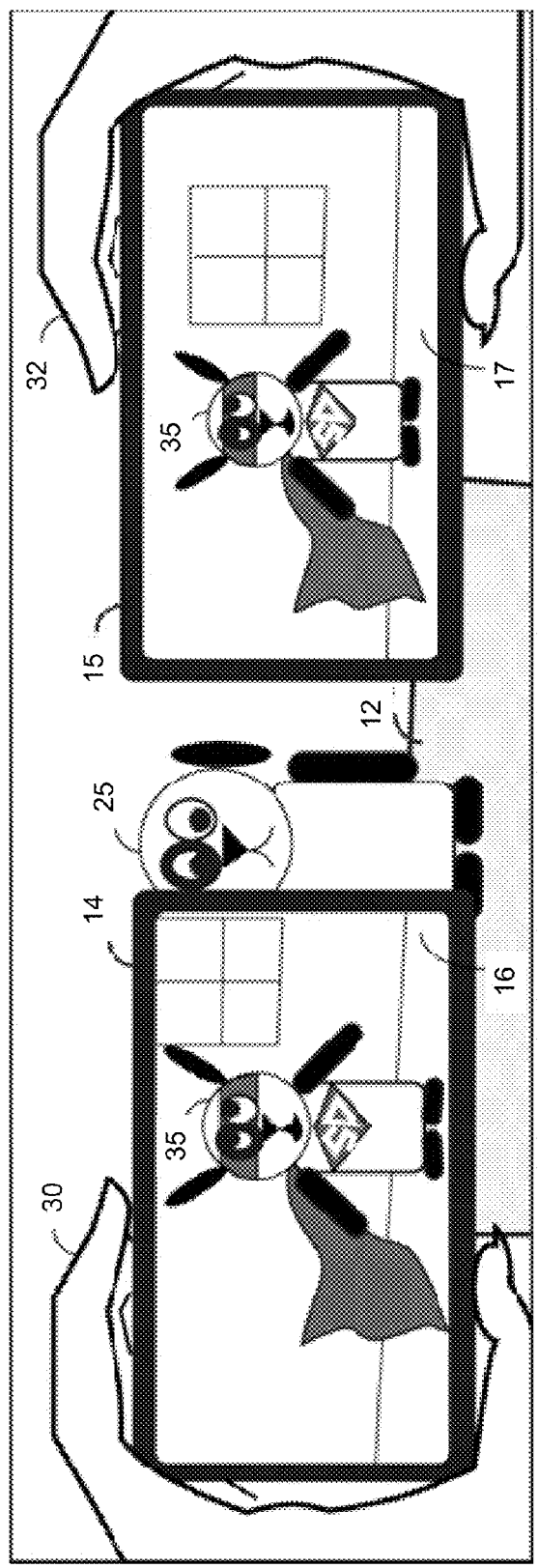

MAINTAINING CONTINUITY OF AUGMENTATIONS

CROSS REFERENCE TO RELATED APPLICATIONS

This application claims the benefit of U.S. provisional application No. 61/676,246, "Interactions of Tangible and Augmented Reality Objects" filed Jul. 26, 2012; U.S. provisional application No. 61/676,249, "Maintaining Continuity of Augmentations" filed Jul. 26, 2012; U.S. provisional application No. 61/676,278, "Method and Apparatus for Controlling Augmented Reality" filed Jul. 26, 2012; U.S. provisional application No. 61/676,255, "Interactions of Tangible and Augmented Reality Objects" filed Jul. 26, 2012; and U.S. provisional application No. 61/676,274, "Tangible Items' Effect on Particle System Augmentation in Virtual Spaces" filed Jul. 26, 2012. The aforementioned United States applications are hereby incorporated by reference in their entirety.

FIELD

The present disclosure relates to the field of augmented reality. In particular, the present disclosure relates to maintaining continuity of augmentations.

BACKGROUND

Conventional augmented reality applications provide a live view of a real-world environment whose elements may be augmented by computer-generated sensory input such as video, sound, graphics or GPS data. With such applications, a view of reality may be modified by a computing device, and they can enhance a user's perception of reality and provide more information about the user's environment. For example, augmented contents may be applied in real-time and in semantic context with environmental elements, such as game statistics and summaries during a match. With the proliferation of mobile devices, such as smart phones, information about the surrounding real world of a user may be displayed on a mobile device with additional augmented contents, such as artificial information about the environment with virtual objects being overlaid on the real-world objects. For example, the mobile device can be configured to play augmented reality games; such games may include play sets and game pieces.

One of the problems of the conventional augmented reality applications is that when an object being tracked is no longer in view of the camera of the mobile device, the conventional augmented reality applications would stop tracking the object. This approach may lead to inadequate user experience, especially in situations where the mobile devices may be moved around when the users interact with their environment, or when one or more game pieces may no longer be in view of the mobile devices. Therefore, there is a need for method, computer program product, and augmented reality enabled device that can improve the conventional augmented reality applications.

SUMMARY

The present disclosure relates to maintaining continuity of augmentations. According to embodiments of the present disclosure, a method for use with an augmented reality enabled device (ARD) comprises tracking a plurality of objects and a background based at least in part on visual information derived from an image, maintaining states of the plurality of objects based at least in part on information other than the visual information, and providing data for rendering augmentation in response to the states of the plurality of objects.

According to another embodiment of the present disclosure, an augmented reality enabled device comprises a control unit including processing logic; the processing logic comprises logic configured to track a plurality of objects and a background based at least in part on visual information derived from an image, logic configured to maintain states of at least one object of the plurality of objects based at least in part on information other than the visual information, and logic configured to provide data for rendering augmentation in response to the states of the plurality of objects.

According to yet another embodiment of the present disclosure, a computer program product for use with an augmented reality enabled device comprises a non-transitory medium storing instructions for execution by one or more computer systems; the instructions comprises instructions for tracking a plurality of objects and a background based at least in part on visual information derived from an image, instructions for maintaining states of at least one object of the plurality of objects based at least in part on information other than the visual information, and instructions for providing data for rendering augmentation in response to the states of the plurality of objects.

According to yet another embodiment of the present disclosure, a system comprises means for tracking a plurality of objects and a background based at least in part on visual information derived from an image, means for maintaining states of at least one object of the plurality of objects based at least in part on information other than the visual information, and means for providing data for rendering augmentation in response to the states of the plurality of objects.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

FIG. 3 illustrates a method of providing interactions based at least in part on tracking markings in a background according to some aspects of the present disclosure.

FIG. 4 illustrates another method of providing interactions based at least in part on tracking multiple objects in a background according to some aspects of the present disclosure.

FIG. 7 illustrates a method of maintaining continuity of augmentations when target is out of view according to some aspects of the present disclosure.

FIG. 8 illustrates another method of maintaining continuity of augmentations by providing correction for lost tracking according to some aspects of the present disclosure.

FIG. 9 illustrates yet another method of providing interactions based at least in part on tracking with RFID according to some aspects of the present disclosure.

FIG. 10 illustrates a method of providing interactions across multiple augmented reality enabled devices according to some aspects of the present disclosure.

Like numbers are used throughout the figures.

DESCRIPTION OF EMBODIMENTS

Embodiments of maintaining continuity of augmentations are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
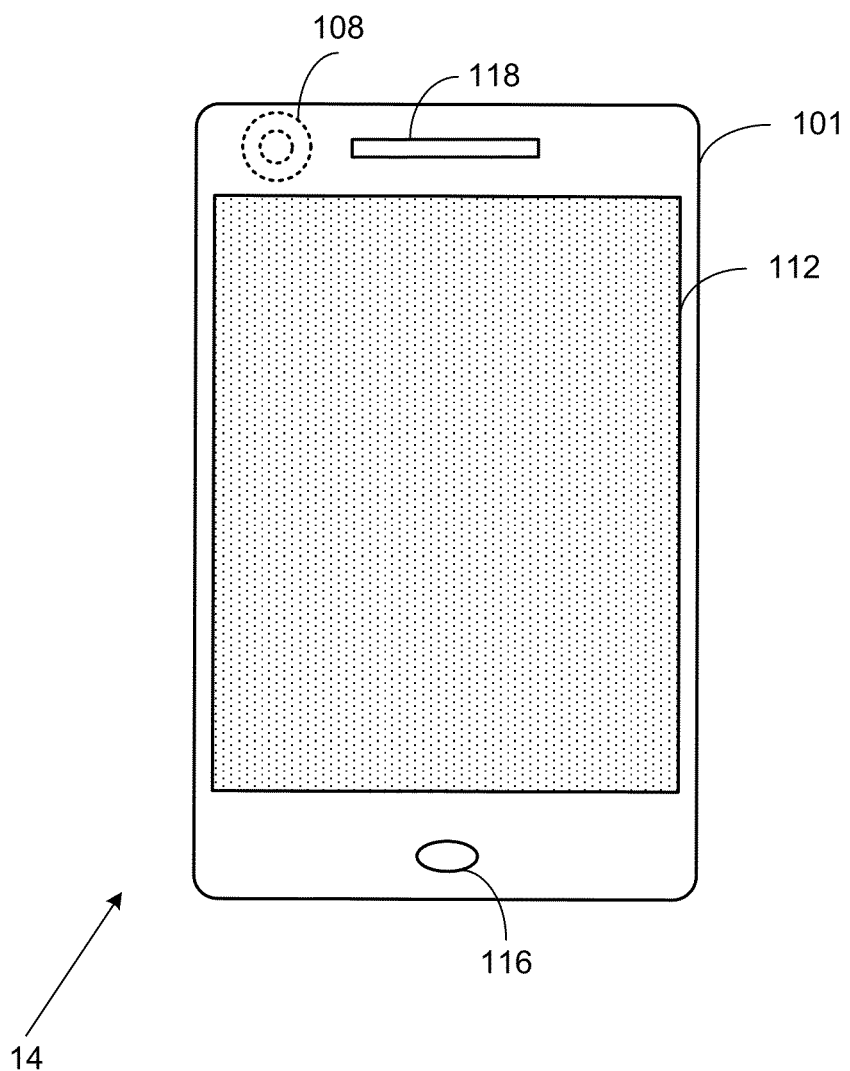
FIG. 1 illustrates an augmented reality enabled device according to some aspects of the present disclosure.

FIG. 1 illustrates an augmented reality enabled device according to some aspects of the present disclosure. As shown in FIG. 1, the augmented reality enabled device (ARD) 14 includes housing 101, display 112, one or more speakers 118, and microphone 116. The display 112, which may be a touch screen display, may illustrate images captured by the camera 108, or any other desired user interface information. Of course, the ARD 14 may include additional components that are not necessarily related to the present disclosure.

As used herein, an ARD device refers to any portable electronic device such as a cellular or other wireless communication device, personal communication system (PCS) device, personal navigation device (PND), Personal Information Manager (PIM), Personal Digital Assistant (PDA), laptop or other suitable mobile platform. The mobile platform may be capable of receiving wireless communication and/or navigation signals, such as navigation positioning signals. The term ARD is also intended to include devices which communicate with a personal navigation device (PND), such as by short-range wireless, infrared, wireline connection, or other connection, regardless of whether satellite signal reception, assistance data reception, and/or position-related processing occurs at the device or at the PND. Also, ARD is intended to include all electronic devices, including wireless communication devices, computers, laptops, tablet computers, smart phones, digital cameras etc. which are capable of capturing images used in pose tracking, as well as capable of performing augmented reality user interface functions.

Figure 2:
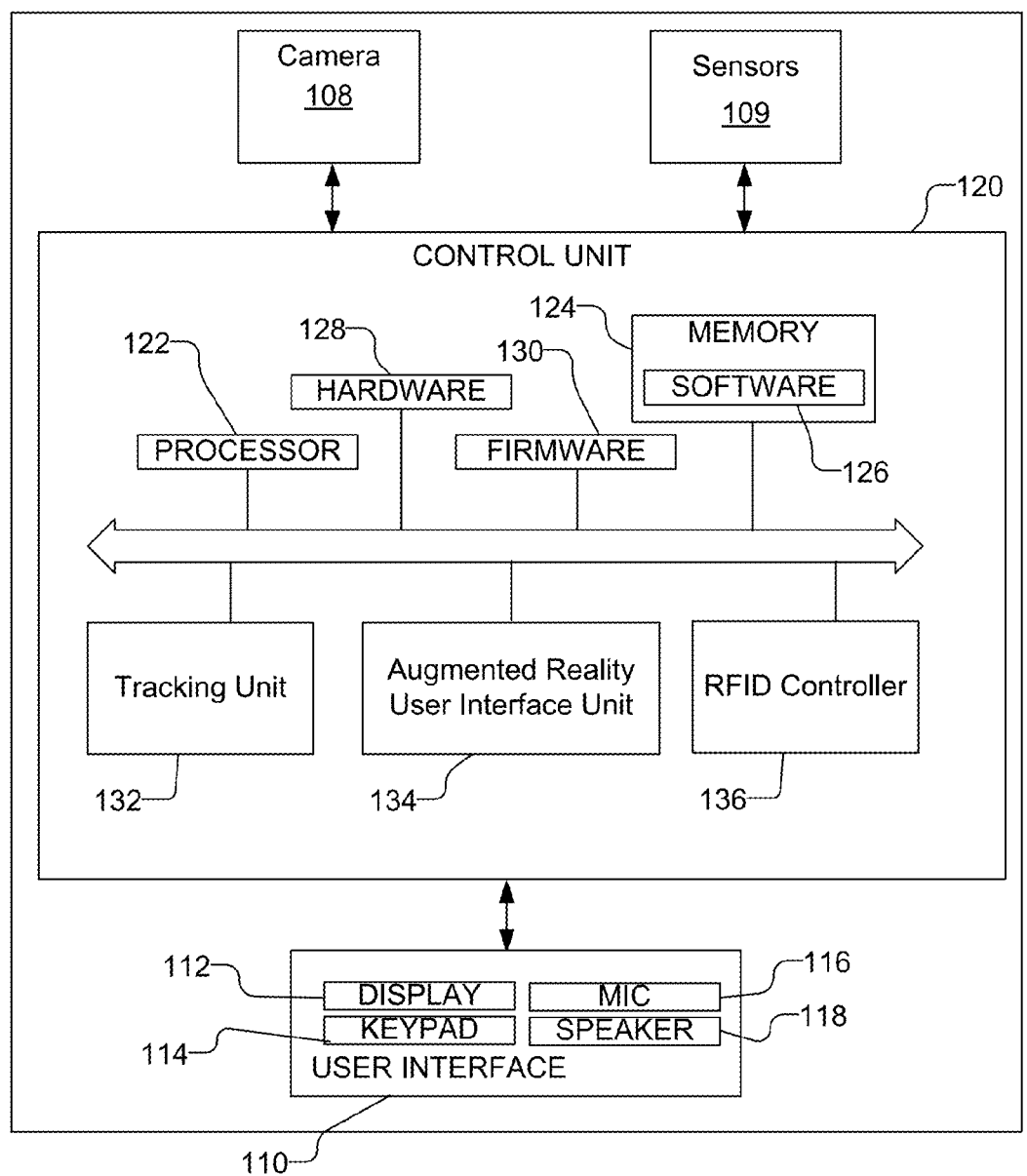
FIG. 2 illustrates a block diagram of an exemplary augmented reality enabled device according to some aspects of the present disclosure.

FIG. 2 illustrates a block diagram of an exemplary augmented reality enabled device according to some aspects of the present disclosure. The mobile platform of the ARD 14 includes a camera 108 for capturing images of the environment, which may be either individual photos or frames of video. The mobile platform of the ARD 14 may also include sensors 109, which may be used to provide data with which the mobile platform of the ARD 14 can determine its position and orientation, i.e., pose. Examples of sensors that may be used with the mobile platform of the ARD 14 include accelerometers, quartz sensors, gyros, micro-electromechanical system (MEMS) sensors used as linear accelerometers, as well as magnetometers. In some implementations, galvanic skin response (GRS) sensors or other biometric sensors may be placed on the sides or surfaces of the ARD 14.

The mobile platform of the ARD 14 may also include a user interface 110 that includes display 112 capable of displaying images. The user interface 110 may also include a keypad 114 or other input device through which the user can input information into the mobile platform of the ARD 14. If desired, the keypad 114 may be obviated by integrating a virtual keypad into the display 112 with a touch sensor. The user interface 110 may also include a microphone 116 and one or more speakers 118, for example, if the mobile platform is a cellular telephone. Of course, mobile platform of the ARD 14 may include other components unrelated to the present disclosure.

The mobile platform of the ARD 14 further includes a control unit 120 that can be connected to and communicates with the camera 108 and sensors 109, as well as the user interface 110, along with any other desired features. The control unit 120 may be provided by one or more processors 122 and associated memory/storage 124. The control unit 120 may also include software 126, as well as hardware 128, and firmware 130. The control unit 120 includes a tracking unit 132 configured to track the position of the ARD 14 as well as to track positions of one or more objects monitored by the ARD 14. The control unit 120 may further include augmented reality user interface unit 134 configured to present augmented reality interactions on the display 112 of the ARD 14. The control unit 120 may further include RFID controller 136 configured to communicate with one or more RFID sensors or signatures. The tracking unit 132, augmented reality user interface unit 134 and RFID controller are illustrated separately from processor 122 and/or hardware 128 for clarity, but may be combined and/or implemented in the processor 122 and/or hardware 128 based on instructions in the software 126 and the firmware 130.

According to aspects of the present disclosure, the ARD 14 may be used in conjunction with one or more tangible interface items. In many of the examples described herein, the tangible interface items are referred to as "objects" or "toys." However, other types of tangible objects may also be used and the techniques disclosed herein are not limited to toys. For example, the tangible interface items may include one or more items in the user's environment, such as a cola can, a coffee cup, a magazine, or other tangible item that may be within the field of view of the camera of the ARD 14.

The augmentation provided by the ARD 14 can form a continuous story path. Such a continuous story path may be referred to herein as a "scene." The augmentation logic of the ARD 14 can be configured to monitor the attentiveness of a user and to change scenes if it appears that the user has lost interest in a particular scene. Techniques for interacting with the user and for tailoring the augmentation content provided by the ARD 14 are described in greater detail below.

According to embodiments of the present disclosure, the ARD 14 is configured to provide a coherent user experience, to preserve the suspension of disbelief, and to encourage exploration. The disclosed methods maintain continuity of a scene while the user explores the environment, even if certain objects may be out of the camera view of the ARD 14. In other words, the ARD 14 can be configured to track the environment independent of the object being tracked. In addition, the ARD 14 may be configured to further augment the environment with additional information, such as a floor and/or one or more virtual windows 36, virtual doors 37, and virtual walls 38 in the augmented environment 16 as illustrated in FIG. 3.

Figure 5:
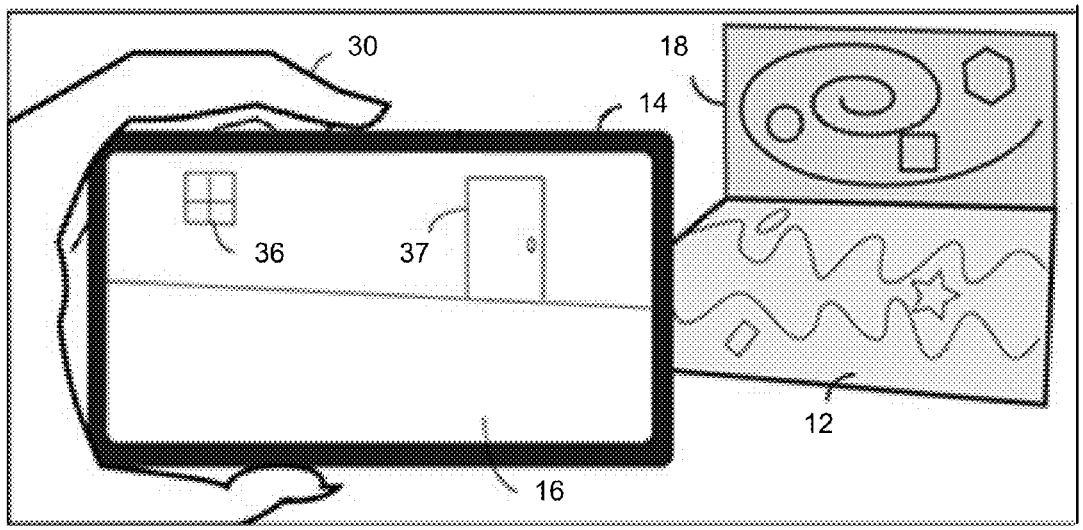
FIG. 5 illustrates yet another method of providing interactions based at least in part on tracking items in a real environment according to some aspects of the present disclosure.

In some implementations, the method of tracking a reference background 12 (such as a mat) may include but not limited to: 1) tracking sub areas of the mat; 2) tracking markings or sub-features on the mat as illustrated in FIG. 3; 3) tracking multiple small mats that may be combined, temporarily or permanently, to form a larger mat (for example tiles on a bathroom floor, such as 12a-12e) as illustrated in FIG. 4; and 4) tracking relationships of these sub-areas/markings/small mats to the overall mat such that having one sub-area/marking/small mat in the camera view of the ARD 14 can enable the ARD 14 to determine where on the larger mat the user may be looking at. In some other implementations, the environment may include one or more tangible walls 18, which may be attached to the mat, to create a playroom as illustrated in FIG. 5. The playroom may be augmented with augmented window(s) 36 and augmented door(s) 37. In other implementations, the environment of the actual playroom may be used, that is, the tangible playroom may not be augmented. The wall(s) 18 and subsections of the wall may be tracked as described below.

Figure 6:
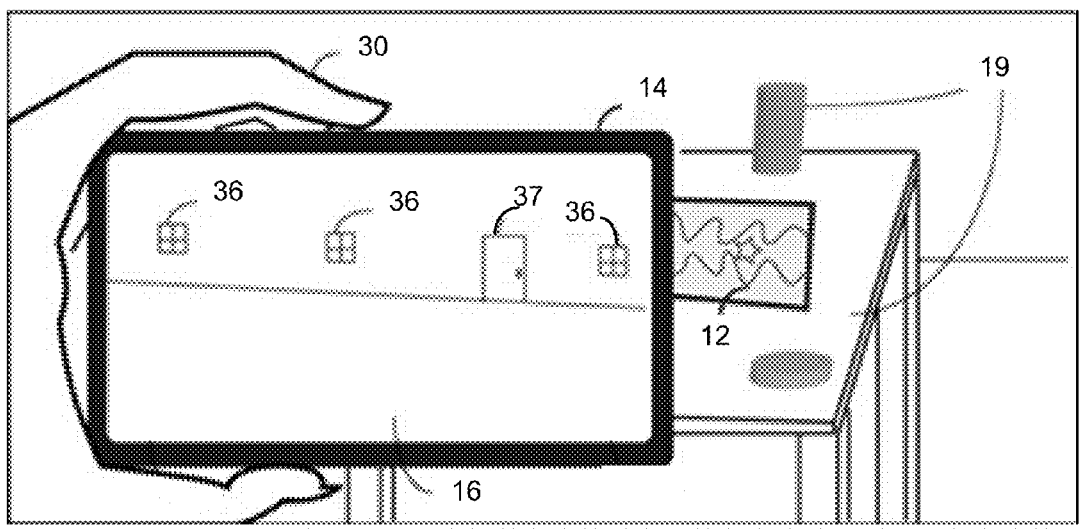
FIG. 6 illustrates yet another method of providing interactions based at least in part on tracking items in both virtual and real environment according to some aspects of the present disclosure.

As shown in FIG. 6, the method includes identifying and tracking details in the environment to create a map of the environment on-the-fly (using reference free AR) and then identify which subsection the user is currently focused on, and the relationship between the subsection and the overall map. The method may further include the ability to expand the virtual environment 16 beyond the reference background 12, such as a table and objects on the table 19 via on-the-fly mapping of the real world environment (using reference free AR).

According to aspects of the present disclosure, a simultaneous localization and tracking (SLAM) framework may be employed by the ARD 14 to track objects in its environment. For example, the ARD 14 can be configured to build up a SLAM environment. The SLAM environment can be configured as a dense mesh or a dense/sparse point cloud, for example, with three-dimensional (3D) positions relative to the SLAM environment coordinate frame origin. Each feature point in the environment may include one or more descriptors that describe the visual appearance of the feature point, and/or 3D structural information about the feature. For example, surfaces and their corresponding surface normals of the 3D environment may be used to describe various feature points in the SLAM environment. Note that the feature points may be captured by the mobile device over a series of image frames.

In some implementations, augmentation may continue when a target is out of view. Upon initiating a play, when a background 12, such as a bathroom or a floor comes into view, augmentation 16 for that scene can be displayed. When an object comes into view, its corresponding augmentation can be shown in the scene—such as a bathtub 22 causes an augmentation of an animated bathtub 32 with bubbles 33 and a Rubber Duck 39, and audio of bubbles may be played. When the augmented bathtub 32 goes out of frame, for example when the physical object is no longer in view due to movement of the ARD 14, the position of the bathtub 22 relative to the reference background 12, for example the floor, can be recorded in memory and the bathtub 22 may continue to affect the scene as long as tracking of the environment is maintained, as illustrated in FIG. 7. In this example, when the target is out of view of the ARD 14, augmentation may continue by having 1) audio of bubbles continues to play; 2) video of bubbles 33 float in the air; and 3) the user pans to Bernie in the bathroom (not shown) and he says, "Oh, Rubber Duck, there you are!"

In one approach, the augmentation of the bathtub may appear to emanate from its location on the bathroom floor. The sound of the bubbles can be made louder when the user is near the location and get quieter when the user moves away. The augmentation may continue, emanating from the same spot on the bathroom floor as long as the view is within a predetermined distance from the bathtub, for example can be heard in the bathroom, but not in the living room, up to the extent of tracking the environment. The augmentation may resume when the view returns to within the predetermined distance.

In another approach, the augmentation may continue as follows, including but not limited to: 1) as long as two hands of the user remain on the ARD 14 as detected by galvanic skin response (GSR) or other biometric sensors on the sides or surfaces of the ARD 14; 2) as long as at least one hand remains on the camera as detected by GSR or other biometric sensors on the sides or surfaces of the device; 3) as long as the same user is detected holding the camera as detected by comparing biometric sensor data from the device over time. For example, heart rhythm signature, or fingerprint from sensor on any surface of the device; 4) until the bathtub is seen moving, for example in a new floor position, or until the area of the bathroom floor previously associated with the object is seen empty; 5) until a predetermined period of time has passed without returning to the bathtub or bathtub area; 6) after the camera has been stationary for a time t; or 7) as long as the camera is moving. Note that in some implementations, the control unit 120 may assume an object may be static if not perceived in view; and the control unit 120 may assume objects do not move when the camera is being moved.

According to embodiments of the present disclosure, after a scene starts, it continues to play and does not start over under the following conditions, including but not limited to: 1) as long as the camera has been touched in a predetermined time interval; 2) as long as the camera is moving; 3) as long as the camera has moved in a predetermined time interval; 4) as long as the camera is in a hand as determined by biometric sensors; or 5) as long as the same user is holding the camera as determined by no substantial change in biometric sensor data.

According to embodiments of the present disclosure, the ARD 14 is configured to correct for lost tracking, including but not limited to the following situations. First, if the ARD 14 is within a close proximity to an object, for example Birdie, and then loses the object, the control unit 120 of the ARD 14 can be configured to assume the object may still be there for a predetermined amount of time as shown in FIG. 8. For example, the control unit 120 may assume the object may have gotten too close to effectively identify or track an object, thus the scene may continue to be displayed. Second, if the ARD 14 is moving towards the object (for example Birdie's relative size is increasing), then object may be lost from view, the control unit 120 may assume that the object is still there for a predetermined period of time. The control unit 120 may further assume the user may intend to zoom in on the object but has miss-aligned the ARD 14 with the object, occluded the object with user's hand, etc. Third, if the object goes out of view in one location (e.g. the bathroom floor) and is later detected in another location (e.g. in another area of the bathroom), the scene continues. The object may be augmented by the new location. In this case, the control unit 120 would not start over or lose its history. Last but not least, if a user has one scene in play, for example Birdie watching TV, then the ARD 14 may zoom in onto Birdie to cause a scene change, when the ARD 14 zooms back out, the scene may have Birdie resumes watching TV. The scene may be augmented with interactions during the zooming operation, but the control unit 120 would not start over or lose the history of the scene.

According to embodiments of the present disclosure, the ARD 14 can be configured to combine different methods of establishing continuity of scene augmentation with off-camera tangible interface items. Along with visual object recognition and tracking, additional methods may be used to maintain a location map of objects with respect to a background, such as a floor or a mat. In some implementations as illustrated in FIG. 9, near field tracking using RFIDs can be implemented in the ARD 14 such that even relative location of an object (10) to a background (12) can be established if the item is still in the room.

In one exemplary approach, the field of view of the ARD 14 has been moved so the bathtub on the bathroom floor may be out of view. An RFID controller associated with the reference background 12, such as a mat, can be configured to detect the RFID signature (represented by wave 200) of the bathtub 22. The RFID controller may send the information (represented by wave 210) to the ARD 14 as shown in FIG. 9. The ARD 14 may be configured to assume the bathtub remains still in the last location it was observed. Thus, the ARD 14 may continue to provide augmentation based at least in part on the location information of the bathtub received from the RFID controller. In the event that the RFID controller does not detect the RFID signature of the bathtub, it may pass this information to the ARD 14. The ARD 14 may assume the bathtub has moved, thus stops augmentation by having the bubble sound gracefully fades out, or by having bubbles pop in the air pop.

In another approach, the near field tracking on the mat includes a method for determining sub-position of objects on the mat, for example by using a series or a grid of RFID coils in the mat. In this way, the RFID controller associated with the mat maintains both an inventory of what objects are on the mat as well as their positions or approximate positions. Then, the RFID controller may send the location information to the ARD 14. In addition, the RFID controller may send any change of location, such as addition, or removal of an object to the ARD 14. The ARD 14 can be configured to track both in view objects and out of view objects from the perspective of the ARD 14, and uses such location information to provide augmentations. Note that audio augmentation may continue even if no identifiable object or environment may be in the camera view of the ARD 14.

In yet another approach, one or more mats equipped with RFID capabilities may be configured to maintain an inventory and placements of objects, and optionally maintain relative locations of objects with respect to the mat. In one approach, the information from different mats can be used in conjunction to make inferences about the scene and provide appropriate augmentation regardless of the camera view of the ARD 14. For example, if a character (e.g. Bernie) moves from one room to another room so that it is now in the same room with another character (e.g. Brett), and the camera view of the ARD 14 may be in the second room, the characters can begin to interact regardless whether the characters are in the camera view of the ARD 14. An exemplary augmentation may show Brett turns to address Bernie who has entered the room but Bernie may not be in the camera view.

In some other implementation, the ARD 14 may be configured to use sensor data received from at least one of accelerometer, gyro, and magnetometer to augment visual tracking (for example, using dead reckoning in some embodiments). In one approach, the ARD 14 may be configured to track the relative distance and direction to an object (e.g. bathtub) using sensor data to supplement visual tracking, when a visual reference is out of view. The ARD 14 may use the sensor data to provide continuation of the augmentation by using the technique of dead reckoning in determining position relative to a target.

In another approach, the ARD 14 may be configured to use sensor data together with visual tracking to determine movement of the object (e.g. bathtub) relative to the ARD 14. If sensor data indicates the ARD 14 may be relatively still, the control unit 120 of the ARD 14 may assume the bathtub is moving (e.g. out of the scene) and adjusts augmentation accordingly. If sensor data indicates ARD 14 is moving, and the movement is determined to be sufficient to justify the movement seen on the screen, then the control unit 120 assumes the bathtub is still in place and the ARD 14 is moving, and keeps the augmentation accordingly. Alternatively if the movement may be determined to be insufficient to justify the movement seen on the screen, then the control unit 120 may assume both the bathtub 22 and the ARD 14 may be moving, and adjusts the augmentation accordingly.

According to embodiments of the present disclosure, multiple ARDs may be configured to maintain augmentation across the multiple ARDs. As illustrated in FIG. 10, if multiple users with corresponding augmented reality enabled devices are playing with the same play set at or near the same time, certain augmentation elements can remain substantially the same across the multiple ARDs, while others augmentation elements may differ.

In one exemplary implementation, if a door from a bathroom to a living room is seen open at the same time across multiple ARDs pointing at the door from different rooms or different directions. The door remains open across the multiple ARDs until a user closes it. In another exemplary implementation, if a user 30 turns Dog 25 into Super Dog 35, another user 32 on another ARD 15 may see Dog 25 as Super Dog 35 as well. Note that the sound augmentation from each ARD may be related to the play the particular ARD may be pointing at.

In addition, sound in another room (e.g. in the bathroom when a user is playing in the living room) may not be heard at all as long as no virtual window or door is open; the sound may be heard quietly or not at all if a virtual window or door is open; or the sound may be heard upon a virtual window or door is being opened, and then it may fade. For example, if a bathroom window is opened, birds may be heard at first and then fade out after certain period of time.

According to embodiments of the present disclosure, the ARD 14 can be configured to provide environmental sound augmentation. In some implementations, the sound for objects in view can be the only sound heard, louder than other sound, or balanced according to recent events. The sound for objects out of view may differ in loudness, which can be determined by the duration the objects have been out of view.

According to embodiments of the present disclosure, the ARD 14 can be configured to maintain sound continuity within a scene. In some implementations, the scene may be preserved in situations if the ARD 14 is set down, objects may be occluded by the hand, or the ARD 14 device momentarily points away.

In one approach, if scene progression audio is being played (e.g. a character is speaking or a video is playing), then the audio continues (e.g. video sound plays through) in the following scenarios, including but not limited to: 1) when the ARD 14 is facing the play, for example, some part of an object or an area of floor at or near the action ("the play area") is still in view, and the view may not be moving or the sensors do not sense movement; 2) the device is not set down but no characters are in site (e.g. hand is occluding camera, the user's hand has drooped, the device has lost tracking); 3) the device briefly points to another character then returns to original play area within a predetermined period of time (e.g. 0 to 3 seconds); 4) the ARD 14 moves towards the objects in the same scene flow, then off screen sound may reduce volume, or an off screen character may continue to talk and incorporate new item in the scene. For example, Bernie is talking to his Rubber Duck when a user pans to a car, an augmented Bernie may say, "I know what, Ducky, let's take a ride in the car!"

In another approach, the audio may conclude and then stop when the ARD 14 is set down not facing the play area. For example, the play is not in view, the view is not moving, or the sensors do not sense movement. Alternatively, the ARD 14 may move to a new object in a similar scene flow. For example, the ARD 14 is on Bernie and Brett and then moves to Birdie for the first time in this play session. In yet another approach, the audio may stop, for example video sound stops or fades out, if the view of the ARD 14 has moved to a different set of objects for more than a predetermined period of time.

Figure 11:
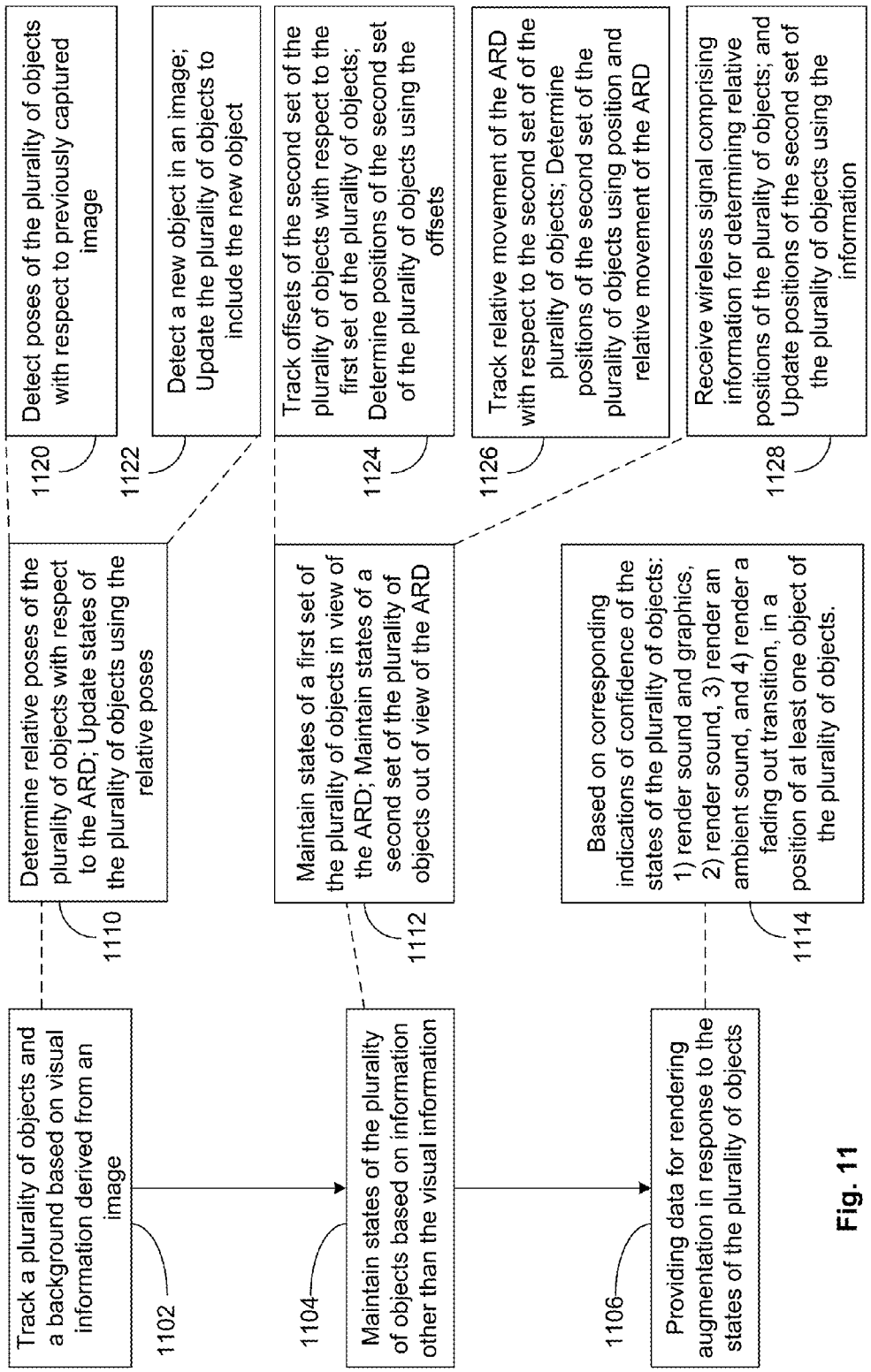
FIG. 11 illustrates a flow diagram of maintaining continuity of augmentations according to some aspects of the present disclosure.

According to some aspects of the present disclosure, the functions described in FIG. 11 may be implemented by the control unit 120 of FIG. 2. In some implementations, the functions may be performed by processor 122, software 126, hardware 128, and firmware 130, or a combination of these blocks to perform various functions of the ARD described above, including the functions performed by the tracking unit 132 and the augmented reality user interface unit 134.

FIG. 11 illustrates a flow diagram of maintaining continuity of augmentations according to some aspects of the present disclosure. In block 1102, the control unit 120 can be configured to track a plurality of objects and a background based at least in part on visual information derived from an image. In block 1104, the control unit 120 can be configured to maintain states of the plurality of objects based at least in part on information other than the visual information. In block 1106, the control unit 120 can be configured to provide data for rendering augmentation in response to the states of the plurality of objects.

According to embodiments of the present disclosure, the methods performed in block 1102 may further include methods performed in block 1110. For example, in block 1110, the control unit 120 can be configured to determine relative poses of the plurality of objects with respect to the ARD, and update states of the plurality of objects using the relative poses, where the states of the plurality of objects include relational information of the plurality of objects. The methods performed in block 1110 may further include methods performed in blocks 1120-1122. In block 1120, the control unit 120 detects poses of the plurality of objects with respect to a previously captured image of the plurality of objects. In block 1122, the control unit 120 detects a new object in the image, and updates the plurality of objects to include the new object.

The methods performed in block 1104 may further include methods performed in block 1112. In block 1112, the control unit 120 maintains states of a first set of the plurality of objects in view of the ARD, and maintains states of a second set of the plurality of objects out of view of the ARD. The methods performed in block 1112 may further include methods performed in blocks 1124-1128. In block 1124, the control unit 120 tracks offsets of the second set of the plurality of objects with respect to the first set of the plurality of objects in view of the ARD 14, and determines positions of the second set of the plurality of objects using the offsets. In block 1126, the control unit 120 tracks relative movement of the ARD 14 with respect to the second set of the plurality of objects out of view of the ARD 14, and determines positions of the second set of the plurality of objects using position and relative movement of the ARD 14. The method of tracking relative movement of the ARD 14 is based at least in part on at least one of: visual odometry, dead reckoning with accelerometer, and dead reckoning with gyroscope.

In block 1128, the control unit 120 receives wireless signals comprising information for determining relative positions of the plurality of objects, and updates positions of the second set of the plurality of objects using the information. In some implementations, the wireless signals are received by the ARD 14 from an RFID tag attached to at least one object in the second set of the plurality of objects. The wireless signals comprise at least one of near field communication signals and Bluetooth signals. The background comprises one or more sensors configured to detect a position of at least one object in the plurality of objects, and the information is indicative of a position detected by the one or more sensors.

The methods performed in block 1106 may further include methods performed in block 1114. In block 1114, the control unit 120 is configured to render sound and graphics in a position when an indication of confidence of the states of the plurality of objects meets a first predetermined value, render sound in the position when the indication of confidence of the states of the plurality of objects meets a second predetermined value, render an ambient sound in the position when the indication of confidence of the states of the plurality of objects meets a third predetermined value, and render a fading out transition in the position when the indication of confidence of the states of the plurality of objects meets a fourth predetermined value.

In some implementations, the plurality of objects in block 1102 may be game pieces and the background is a game board. The states of the plurality of objects may comprise relational information of the plurality of objects with respect to each other, relational information of the plurality of objects with respect to the background, geometrical relationships of the plurality of objects with respect to each other, and geometrical relationships of the plurality of objects with respect to the background.

In block 1112, the control unit 120 may be further configured to track at least one object in the second set of the plurality of objects out of view of the ARD 14, determine the at least one object still exists, and render at least one of sound and graphics in a position of the at least one object. In addition, the control unit 120 may be further configured to track at least one object in the second set of the plurality of objects out of view of the ARD 14, determine the at least one object on longer exists, and render at least one of a fading out transition and an ambient sound in a position of the at least one object.

In some other implementations, the control unit 120 may be further configured to track the plurality of objects and the background with multiple augmented reality enabled devices (ARDs), maintain states of the plurality of objects across the multiple ARDs, and provide data for rendering augmentations in the multiple ARDs in response to the states of the plurality of objects.

According to aspects of the present disclosure, a computer program product for use with an augmented reality enabled device comprises a non-transitory medium storing instructions for execution by one or more computer systems; the instructions comprises instructions for tracking a plurality of objects and a background based at least in part on visual information derived from an image, instructions for maintaining states of at least one object of the plurality of objects based at least in part on information other than the visual information, and instructions for providing data for rendering augmentation in response to the states of the plurality of objects.

The instructions for tracking comprises performing 3-dimensional tracking comprises instructions for determining relative poses of the plurality of objects with respect to the ARD, and instructions for updating states of the plurality of objects using the relative poses, where the states of the plurality of objects include relational information of the plurality of objects. The instructions for determining relative poses comprise instructions for detecting poses of the plurality of objects with respect to a previously captured image of the plurality of objects. The instructions for determining relative poses comprise instructions for detecting a new object in the image, and instructions for updating the plurality of objects to include the new object.

The instructions for maintaining states of the plurality of objects comprises instructions for maintaining states of a first set of the plurality of objects in view of the ARD, and instructions for maintaining states of a second set of the plurality of objects out of view of the ARD. The instructions for maintaining states of a second set of the plurality of objects out of view of the ARD comprises instructions for tracking offsets of the second set of the plurality of objects with respect to the first set of the plurality of objects in view of the ARD, and instructions for determining positions of the second set of the plurality of objects using the offsets. The instructions for maintaining states of a second set of the plurality of objects out of view of the ARD further comprises instructions for tracking relative movement of the ARD with respect to the second set of the plurality of objects out of view of the ARD, and instructions for determining positions of the second set of the plurality of objects using position and relative movement of the ARD. The instructions for tracking relative movement of the ARD are based at least in part on at least one of: visual odometry, dead reckoning with accelerometer, and dead reckoning with gyroscope.

The instructions for maintaining states of a second set of the plurality of objects out of view of the ARD further comprises instructions for receiving information related to wireless signals for determining relative positions of the plurality of objects, and instructions for updating positions of the second set of the plurality of objects using the information received. The wireless signals are received by the ARD from an RFID tag attached to at least one object in the second set of the plurality of objects. The wireless signals comprise at least one of near field communication signals and Bluetooth signals. The background comprises a mat including one or more sensors configured to detect the relative positions of the plurality of objects, and the information is indicative of the relative positions of the plurality of objects detected by the one or more sensors. The information is received at a processor or chip integrated into the ARD based on the wireless signals being received at the ARD.

According to aspects of the present disclosure, the computer program product further comprises instructions for tracking at least one object in the second set of the plurality of objects out of view of the ARD, instructions for determining the at least one object in the second set of the plurality of objects still exists, and instructions for rendering at least one of sound and graphics in a position of the at least one object in the second set of the plurality of objects. The computer program product further comprises instructions for tracking at least one object in the second set of the plurality of objects out of view of the ARD, instructions for determining the at least one object in the second set of the plurality of objects no longer exists, and instructions for rendering at least one of a fading out transition and an ambient sound in a position of the at least one object in the second set of the plurality of objects. The computer program product further comprises instructions for ceasing to track a first object in the second set when the ARD is panned to a location where the first object is expected to be located and it is determined that the first object is not present at the location, and instructions for ceasing an audio augmentation associated with the first object. The computer program product further comprises instructions for ceasing to track a first object in the second set when a new scene is detected, and instructions for ceasing an audio augmentation associated with the first object.

The instructions for rendering augmentation comprise at least one of: instructions for rendering sound and graphics in a position when an indication of confidence of the states of the plurality of objects meets a first predetermined value, instructions for rendering sound in the position when the indication of confidence of the states of the plurality of objects meets a second predetermined value, instructions for rendering an ambient sound in the position when the indication of confidence of the states of the plurality of objects meets a third predetermined value, and instructions for rendering a fading out transition in the position when the indication of confidence of the states of the plurality of objects meets a fourth predetermined value. The plurality of objects is game pieces and the background is a game board. The states of the plurality of objects comprise at least one of: relational information of the plurality of objects with respect to each other, relational information of the plurality of objects with respect to the background, geometrical relationships of the plurality of objects with respect to each other, and geometrical relationships of the plurality of objects with respect to the background.

The computer program product further comprises instructions for tracking the plurality of objects and the background with multiple augmented reality enabled devices (ARDs), instructions for maintaining states of the plurality of objects across the multiple ARDs, and instructions for providing data for rendering augmentations in the multiple ARDs in response to the states of the plurality of objects. The background comprises at least one of: a mat, and a wall.

According to aspects of the present disclosure, identifying and tracking features in image frames may be performed using a number of techniques. In one approach, a method of identifying features may be performed by examining the minimum eigenvalue of each 2 by 2 gradient matrix. Then the features are tracked using a Newton-Raphson method of minimizing the difference between the two windows. The method of multi-resolution tracking allows for relatively large displacements between images. Note that during tracking of features from one frame to the next frame, errors may accumulate. To detect potentially bad features, the mobile device may be configured to monitor whether the image signal in the window around the feature in the current frame is still similar to the image signal around the feature in the previous frame. Since features may be tracked over many frames, the image content may be deformed. To address this issue, consistency check may be performed with a similarity or an affine mapping.

According to aspects of the present disclosure, to identify an object in an image, points on the object may be extracted to provide feature descriptions (also referred to as keypoints, feature points or features for short) of the object. This description, extracted from a training image, may then be used to identify the object when attempting to locate the object in a test image containing many other objects. To perform reliable recognition, the features extracted from the training image may be detectable even under changes in image scale, noise and illumination. Such points usually lie on high-contrast regions of the image, such as object edges.

Another characteristic of these features is that the relative positions between them in the original scene may not change from one image to another. For example, if only the four corners of a door are used as features, they may work regardless of the door's position; but if points in the frame are used, the recognition may fail if the door is opened or closed. Similarly, features located in articulated or flexible objects may typically not work if any change in their internal geometry happens between two images in the set being processed. In some implementations, SIFT detects and uses a larger number of features from the images, which can reduce the contribution of the errors caused by the local variations in the average error of all feature matching errors. Thus, the disclosed method may identify objects even among clutter and under partial occlusion; because the SIFT feature descriptor can be invariant to uniform scaling, orientation, and partially invariant to affine distortion and illumination changes.

For example, keypoints of an object may first be extracted from a set of reference images and stored in a database. An object is recognized in a new image by comparing each feature from the new image to this database and finding candidate matching features based on Euclidean distance of their feature vectors. From the full set of matches, subsets of keypoints that agree on the object and its location, scale, and orientation in the new image may be identified to filter out good matches. The determination of consistent clusters may be performed by using a hash table implementation of a generalized Hough transform. Each cluster of 3 or more features that agree on an object and its pose may then be subject to further detailed model verification and subsequently outliers may be discarded. The probability that a particular set of features indicates the presence of an object may then be computed based on the accuracy of fit and number of probable false matches. Object matches that pass the tests can be identified as correct with high confidence.

According to aspects of the present disclosure, image feature generation transforms an image into a large collection of feature vectors, each of which may be invariant to image translation, scaling, and rotation, as well as invariant to illumination changes and robust to local geometric distortion. These features share similar properties with neurons in inferior temporal cortex that are used for object recognition in primate vision. Key locations may be defined as maxima and minima of the result of difference of Gaussians function applied in scale space to a series of smoothed and resampled images. Low contrast candidate points and edge response points along an edge may be discarded. Dominant orientations are assigned to localized keypoints. This approach ensures that the keypoints are more stable for matching and recognition. SIFT descriptors robust to local affine distortion may then be obtained by considering pixels around a radius of the key location, blurring and resampling of local image orientation planes.

Features matching and indexing may include storing SIFT keys and identifying matching keys from the new image. In one approach, a modification of the k-d tree algorithm which is also referred to as the best-bin-first search method that may be used to identify the nearest neighbors with high probability using a limited amount of computation. The best-bin-first algorithm uses a modified search ordering for the k-d tree algorithm so that bins in feature space may be searched in the order of their closest distance from the query location. This search order requires the use of a heap-based priority queue for efficient determination of the search order. The best candidate match for each keypoint may be found by identifying its nearest neighbor in the database of keypoints from training images. The nearest neighbors can be defined as the keypoints with minimum Euclidean distance from the given descriptor vector. The probability that a match is correct can be determined by taking the ratio of distance from the closest neighbor to the distance of the second closest.

In one exemplary implementation, matches in which the distance ratio is greater than 0.8 may be rejected, which eliminates 90% of the false matches while discarding less than 5% of the correct matches. To further improve the efficiency of the best-bin-first algorithm, search may be cut off after checking a predetermined number (for example 100) nearest neighbor candidates. For a database of 100,000 keypoints, this may provide a speedup over exact nearest neighbor search by about 2 orders of magnitude, yet results in less than a 5% loss in the number of correct matches.

Note that with the exemplary implementation, the Hough Transform may be used to cluster reliable model hypotheses to search for keys that agree upon a particular model pose. Hough transform may be used to identify clusters of features with a consistent interpretation by using each feature to vote for object poses that may be consistent with the feature. When clusters of features are found to vote for the same pose of an object, the probability of the interpretation being correct may be higher than for any single feature. An entry in a hash table may be created to predict the model location, orientation, and scale from the match hypothesis. The hash table can be searched to identify clusters of at least 3 entries in a bin, and the bins may be sorted into decreasing order of size.

According to aspects of the present disclosure, each of the SIFT keypoints may specify 2D location, scale, and orientation. In addition, each matched keypoint in the database may have a record of its parameters relative to the training image in which it is found. The similarity transform implied by these 4 parameters may be an approximation to the 6 degree-of-freedom pose space for a 3D object and also does not account for any non-rigid deformations. Therefore, an exemplary implementation may use broad bin sizes of 30 degrees for orientation, a factor of 2 for scale, and 0.25 times the maximum projected training image dimension (using the predicted scale) for location. The SIFT key samples generated at the larger scale may be given twice the weight of those at the smaller scale. With this approach, the larger scale may in effect able to filter the most likely neighbors for checking at the smaller scale. This approach also improves recognition performance by giving more weight to the least-noisy scale. According to aspects of the present disclosure, to avoid the issue of boundary effects in bin assignment, each keypoint match may vote for the 2 closest bins in each dimension, giving a total of 16 entries for each hypothesis and further broadening the pose range.

According to aspects of the present disclosure, outliers may be removed by checking for agreement between each image feature and the model, for a given parameter solution. For example, given a linear least squares solution, each match may be required to agree within half the error range that is used for the parameters in the Hough transform bins. As outliers are discarded, the linear least squares solution may be resolved with the remaining points, and the process may be iterated. In some implementations, if less than a predetermined number of points (e.g. 3 points) remain after discarding outliers, the match may be rejected. In addition, a top-down matching phase may be used to add any further matches that agree with the projected model position, which may have been missed from the Hough transform bin due to the similarity transform approximation or other errors.

The decision to accept or reject a model hypothesis can be based on a detailed probabilistic model. The method first computes an expected number of false matches to the model pose, given the projected size of the model, the number of features within the region, and the accuracy of the fit. A Bayesian probability analysis can then give the probability that the object may be present based on the actual number of matching features found. A model may be accepted if the final probability for a correct interpretation is greater than a predetermined percentage (for example 95%).

According to aspects of the present disclosure, in one approach, rotation invariant feature transform (RIFT) method may be employed as a rotation-invariant generalization of SIFT to address under clutter or partial occlusion situations. The RIFT descriptor may be constructed using circular normalized patches divided into concentric rings of equal width and within each ring a gradient orientation histogram may be computed. To maintain rotation invariance, the orientation may be measured at each point relative to the direction pointing outward from the center.

In another approach, a generalized robust invariant feature (G-RIF) method may be used. The G-RIF encodes edge orientation, edge density and hue information in a unified form combining perceptual information with spatial encoding. The object recognition scheme uses neighboring context based voting to estimate object models.

In yet another approach, a speeded up robust feature (SURF) method may be used which uses a scale and rotation-invariant interest point detector/descriptor that can outperform previously proposed schemes with respect to repeatability, distinctiveness, and robustness. SURF relies on integral images for image convolutions to reduce computation time, and builds on the strengths of the leading existing detectors and descriptors (using a fast Hessian matrix-based measure for the detector and a distribution-based descriptor). The SURF method describes a distribution of Haar wavelet responses within the interest point neighborhood. Integral images may be used for speed, and 64 dimensions may be used to reduce the time for feature computation and matching. The indexing step may be based on the sign of the Laplacian, which increases the matching speed and the robustness of the descriptor.

In yet another approach, the principle component analysis SIFT (PCA-SIFT) method may be used. In some implementations, the PCA-SIFT descriptor is a vector of image gradients in x and y direction computed within the support region. The gradient region can be sampled at 39×39 locations. Thus, the vector can be of dimension 3042. The dimension can be reduced to 36 with PCA. In yet another approach, the Gradient location-orientation histogram (GLOH) method can be employed, which is an extension of the SIFT descriptor designed to increase its robustness and distinctiveness. In some implementations, the SIFT descriptor can be computed for a log-polar location grid with three bins in radial direction (the radius set to 6, 11, and 15) and 8 in angular direction, which results in 17 location bins. The central bin may not be divided in angular directions. The gradient orientations may be quantized in 16 bins resulting in 272 bin histogram. The size of this descriptor can be reduced with PCA. The covariance matrix for PCA can be estimated on image patches collected from various images. The 128 largest eigenvectors may then be used for description.

In yet another approach, a two-object recognition algorithm may be employed to use with the limitations of current mobile devices. In contrast to the classic SIFT approach, the Features from Accelerated Segment Test (FAST) corner detector can be used for feature detection. This approach distinguishes between the off-line preparation phase where features may be created at different scale levels and the on-line phase where features may be created at a current fixed scale level of the mobile device's camera image. In one exemplary implementation, features may be created from a predetermined fixed patch size (for example 15×15 pixels) and form a SIFT descriptor with 36 dimensions. The approach can be further extended by integrating a scalable vocabulary tree in the recognition pipeline. This allows an efficient recognition of a larger number of objects on mobile devices.

According to aspects of the present disclosure, the detection and description of local image features can help in object recognition. The SIFT features can be local and based on the appearance of the object at particular interest points, and may be invariant to image scale and rotation. They may also be robust to changes in illumination, noise, and minor changes in viewpoint. In addition to these properties, the features may be highly distinctive, relatively easy to extract and allow for correct object identification with low probability of mismatch. The features can be relatively easy to match against a (large) database of local features, and generally probabilistic algorithms such as k-dimensional (k-d) trees with best-bin-first search may be used. Object descriptions by a set of SIFT features may also be robust to partial occlusion. For example, as few as 3 SIFT features from an object may be sufficient to compute its location and pose. In some implementations, recognition may be performed in quasi real time, for small databases and on modern computer hardware.

According to aspects of the present disclosure, the random sample consensus (RANSAC) technique may be employed to remove outliers caused by moving objects in view of the camera. Note that the RANSAC uses an iterative method to estimate parameters of a mathematical model from a set of observed data which contains outliers. This method can be a non-deterministic as it produces a reasonable result with an associated probability, where the probability may increase as more iteration is performed.

In one exemplary implementation, a set of observed data values, a parameterized model which can be fitted to the observations with corresponding confidence parameters. In this exemplary implementation, the method iteratively selects a random subset of the original data. These data can be hypothetical inliers and the hypothesis may then be tested as follows:

1. A model can be fitted to the hypothetical inliers, i.e. all free parameters of the model are reconstructed from the inliers.
2. All other data can then be tested against the fitted model and, if a point fits well to the estimated model; it can be considered as a hypothetical inlier.
3. The estimated model can be considered acceptable if sufficiently number of points have been classified as hypothetical inliers.
4. The model can be re-estimated from all hypothetical inliers, because it has only been estimated from the initial set of hypothetical inliers.
5. Finally, the model can be evaluated by estimating the error of the inliers relative to the model.

The above procedure can be repeated for a predetermined number of times, each time producing either a model which may be rejected because too few points are classified as inliers or a refined model together with a corresponding error measure. In the latter case, the refined model can be kept if the error is lower than the previously saved model.

In another exemplary implementation, moving objects in view of the camera can be actively identified and removed using a model based motion tracking method. In one approach, the objective of tracking can be treated as a problem of model recognition. A binary representation of the target can be tracked, and a Hausdorff distance based search can be used to search regions of the image for the object. For a binary representation of the target (a model), output from the standard canny edge detector of the Gaussian smoothed image can be augmented with the notion of a model history. At each frame, a Hausdorff search can be performed on each target, using the canny edges from the current image and the current model. In addition, an affine estimation may be performed to approximate the net background motion. From the results of these two searches, information can be gathered about the target, and be used to approximate the motion of the target, as well as separate the background from motion in the region of the target. To be able to handle hazard/unusual conditions (such as the object becoming occluded going into a shadow, the object leaving the frame, or camera image distortion providing bad image quality), history data about the target may be retained, such as the target's past motion and size change, characteristic views of the target (snapshots throughout time that provide an accurate representation of the different ways the target has been tracked), and match qualities in the past.

The history of tracking the target can be useful in more than just aiding hazard/unusual conditions; that part of a solid motion tracking method can involve history data, and not just a frame by frame method of motion comparison. This history state can provide information regarding how to decide what should be considered part of the target (e.g. things moving close to the object moving at the same speed should be incorporated into the object), and with information about motion and size, the method can predictively estimate where a lost object may have gone, or where it might reappear (which has been useful in recovering targets that leave the frame and reappear later in time).

An inherent challenge in the motion tracking method may be caused by the fact that the camera can have an arbitrary movement (as opposed to a stationary camera), which makes developing a tracking system that can handle unpredictable changes in camera motion difficult. A computationally efficient affine background estimation scheme may be used to provide information as to the motion of the camera and scene.

According to aspects of the present disclosure, an affine transformation for the image can be performed at time t to the image at time t+dt, which allows correlating the motion in the two images. This background information allows the method to synthesize an image at time t+dt from the image at time t and the affine transform that can be an approximation of the net scene motion. This synthesized image can be useful in generating new model information and removing background clutter from the model space, because a difference of the actual image at t+dt and the generated image at t+dt can be taken to remove image features from the space surrounding targets.

In addition to the use of the affine transform as a tool to clean-up the search space, it can also be used to normalize the coordinate movement of the targets: by having a vector to track how the background may be moving, and a vector to track how the target may be moving, a difference of the two vector may be taken to generate a vector that describes the motion of the target with respect to the background. This vector allows the method to predictively match where the target should be, and anticipate hazard conditions (for example looking ahead in the direction of the motion can provide clues about upcoming obstacles, as well as keeping track of where the object may be in case of a hazard condition. When an object enters a hazard condition, the method may still be able to estimate the background motion, and use that coupled with the knowledge of the model's previous movements to guess where the model may reappear, or re-enter the frame.

The background estimation can be a key factor in the prolonged tracking of objects. Note that short term tracking may be performed without background estimation, but after a period of time, object distortion and hazards may be difficult to cope with effectively without a good estimation of the background.

According to aspects of the present disclosure, one of the advantages of using the Hausdorff distance as a matching operator is that it can be quite tolerant of changes in shape during matching, but using the Hausdorff distance as a matching operator may require the objects being tracked be more accurately defined.

In one approach, straight dilation-based methods of grabbing a new model from the time t+1 image can be used. Note that in some situations where there can be non-object features close to the object (which occurs quite often), the dilation method may not be effective because it may slowly incorporate the entire scene into the model. Thus, a method of updating the model from frame to frame that can be tolerant to changes in the model shape, but not so relaxed that causing incorporating non-model pixels into the model may be adopted. One exemplary implementation is to use a combination of background removal and adding the previous models to the current model match window and taking what seems to be stable pixels, as well as the new ones surrounding them, which over time may either get eliminated from the model because they may not be stable, or get incorporated into the model. This approach can be effective in keeping the models relatively clean from clutter in the image. For example, with this approach, no longer does a road close to a truck get pulled into the model pixel by pixel. Note that the models may appear to be dilated, but this may be a result of the history effect of how the models are constructed, but it may also have the feature of making the search results more definite because this method can have more model pixels to possibly match in the next frame.

Note that at each frame, there may be a significant amount of computation to be performed. According to some implementations, the mobile device can be configured to perform smoothing/feature extraction, Hausdorff matching each target (for example one match per model), as well as affine background estimation. Each of these operations can be quite computationally expensive individually. In order to achieve real-time performance on a mobile device, the design can be configured to use as much parallelism as possible.

Note that at least the subsequent three paragraph, FIGS. 1-2, FIG. 11 and their corresponding descriptions provide means for tracking a plurality of objects and a background based at least in part on visual information derived from an image, means for maintaining states of at least one object of the plurality of objects based at least in part on information other than the visual information, and means for providing data for rendering augmentation in response to the states of the plurality of objects.

The methodologies and mobile device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FP- GAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause at least one processor to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:

1. A method for use with an augmented reality enabled device (ARD), comprising:
   tracking a plurality of objects and a background based at least in part on visual information derived from an image;
   maintaining states of the plurality of objects, wherein maintaining states of the plurality of objects comprises maintaining states of a first set of the plurality of objects in view of the ARD and maintaining states of a second set of the plurality of objects out of view of the ARD;
   providing data for rendering augmentation in response to the states of the plurality of objects;
   tracking at least one object in the second set of the plurality of objects out of view of the ARD;
   determining the at least one object in the second set of the plurality of objects no longer exists; and
   rendering at least one of a fading out transition and an ambient sound in a position of the at least one object in the second set of the plurality of objects.

2. The method of claim 1, wherein the tracking comprises performing 3-dimensional tracking comprising:
   determining relative poses of the plurality of objects with respect to the ARD; and
   updating states of the plurality of objects using the relative poses, wherein the states of the plurality of objects include relational information of the plurality of objects.

3. The method of claim 2, wherein determining relative poses comprises:
   detecting a new object in the image; and
   updating the plurality of objects to include the new object.

4. The method of claim 1, wherein the tracking comprises tracking at least one object of the plurality of objects using the visual information when the at least one object is within a field of view of the ARD, and
   wherein the maintaining comprises maintaining the state of the at least one object using the information other than the visual information when the at least one object is out of the field of view.

5. The method of claim 1, wherein maintaining states of a second set of the plurality of objects out of view of the ARD comprises:
   tracking offsets of the second set of the plurality of objects with respect to the first set of the plurality of objects in view of the ARD; and
   determining positions of the second set of the plurality of objects using the offsets.

6. The method of claim 1, wherein maintaining states of a second set of the plurality of objects out of view of the ARD further comprises:
   tracking relative movement of the ARD with respect to the second set of the plurality of objects out of view of the ARD; and
   determining positions of the second set of the plurality of objects using position and relative movement of the ARD.

7. The method of claim 6, wherein tracking relative movement of the ARD is based at least in part on:
   visual odometry;
   dead reckoning with accelerometer;
   dead reckoning with gyroscope; or some combination thereof.

8. The method of claim 1, wherein maintaining states of a second set of the plurality of objects out of view of the ARD further comprises:
   receiving information related to wireless signals for determining relative positions of the plurality of objects; and
   updating positions of the second set of the plurality of objects using the information received.

9. The method of claim 8, wherein the wireless signals are received by the ARD from an RFID tag attached to at least one object in the second set of the plurality of objects.

10. The method of claim 8, wherein the wireless signals comprise at least one of near field communication signals and Bluetooth signals.

11. The method of claim 8, wherein the background comprises a mat including one or more sensors configured to detect the relative positions of the plurality of objects, and wherein the information is indicative of the relative positions of the plurality of objects detected by the one or more sensors.

12. The method of claim 8, wherein the information is received at a processor or chip integrated into the ARD based on the wireless signals being received at the ARD.

13. The method of claim 1, further comprising:
   tracking at least one object in the second set of the plurality of objects out of view of the ARD;
   determining the at least one object in the second set of the plurality of objects still exists; and
   rendering at least one of sound and graphics in a position of the at least one object in the second set of the plurality of objects.

14. The method of claim 1, further comprising:
   ceasing to track a first object in the second set when the ARD is panned to a location where the first object is expected to be located and it is determined that the first object is not present at the location; and
   ceasing an audio augmentation associated with the first object.

15. The method of claim 1, further comprising:
   ceasing to track a first object in the second set when a new scene is detected; and
   ceasing an audio augmentation associated with the first object.

16. The method of claim 1, wherein rendering augmentation comprises:
   rendering sound and graphics in a position when an indication of confidence of the states of the plurality of objects meets a first predetermined value;
   rendering sound in the position when the indication of confidence of the states of the plurality of objects meets a second predetermined value;
   rendering an ambient sound in the position when the indication of confidence of the states of the plurality of objects meets a third predetermined value;
   rendering a fading out transition in the position when the indication of confidence of the states of the plurality of objects meets a fourth predetermined value; or some combination thereof.

17. The method of claim 1, wherein the plurality of objects are game pieces and the background is a game board.

18. The method of claim 1, wherein the states of the plurality of objects comprise:
   relational information of the plurality of objects with respect to each other;
   relational information of the plurality of objects with respect to the background;
   geometrical relationships of the plurality of objects with respect to each other;
   geometrical relationships of the plurality of objects with respect to the background; or some combination thereof.

19. The method of claim 1, further comprising:
   tracking the plurality of objects and the background with multiple augmented reality enabled devices (ARDs);

maintaining states of the plurality of objects across the multiple ARDs; and providing data for rendering augmentations in the multiple ARDs in response to the states of the plurality of objects.

20. The method of claim 1, wherein the background comprises:
   a mat;
   a wall; or some combination thereof.

21. An augmented reality enabled device (ARD), comprising:
   a control unit including processing logic, the processing logic comprising:
   logic configured to track a plurality of objects and a background based at least in part on visual information derived from an image;
   logic configured to maintain states of the plurality of objects, wherein logic configured to maintain states of the plurality of objects comprises logic configured to maintain states of a first set of the plurality of objects in view of the ARD and logic configured to maintain states of a second set of the plurality of objects out of view of the ARD;
   logic configured to provide data for rendering augmentation in response to the states of the plurality of objects;
   logic configured to track at least one object in the second set of the plurality of objects out of view of the ARD;
   logic configured to determine the at least one object in the second set of the plurality of objects no longer exists; and
   logic configured to render at least one of a fading out transition and an ambient sound in a position of the at least one object in the second set of the plurality of objects.

22. The augmented reality enabled device of claim 21, wherein the logic configured to track comprises performing 3-dimensional tracking comprising:
   logic configured to determine relative poses of the plurality of objects with respect to the ARD; and
   logic configured to update states of the plurality of objects using the relative poses, wherein the states of the plurality of objects include relational information of the plurality of objects.

23. The augmented reality enabled device of claim 22, wherein logic configured to determine relative poses comprises:
   logic configured to detect poses of the plurality of objects with respect to a previously captured image of the plurality of objects.

24. The augmented reality enabled device of claim 22, wherein logic configured to determine relative poses comprises:
   logic configured to detect a new object in the image; and
   logic configured to update the plurality of objects to include the new object.

25. The augmented reality enabled device of claim 21, wherein logic configured to maintain states of a second set of the plurality of objects out of view of the ARD comprises:
   logic configured to track offsets of the second set of the plurality of objects with respect to the first set of the plurality of objects in view of the ARD; and
   logic configured to determine positions of the second set of the plurality of objects using the offsets.

26. The augmented reality enabled device of claim 21, wherein logic configured to maintain states of a second set of the plurality of objects out of view of the ARD further comprises:

logic configured to track relative movement of the ARD with respect to the second set of the plurality of objects out of view of the ARD; and
   logic configured to determine positions of the second set of the plurality of objects using position and relative movement of the ARD.

27. The augmented reality enabled device of claim 26, wherein logic configured to track relative movement of the ARD is based at least in part on:
   visual odometry;
   dead reckoning with accelerometer;
   dead reckoning with gyroscope; or some combination thereof.

28. The augmented reality enabled device of claim 21, wherein logic configured to maintain states of a second set of the plurality of objects out of view of the ARD further comprises:
   logic configured to receive information related to wireless signals for determining relative positions of the plurality of objects; and
   logic configured to update positions of the second set of the plurality of objects using the information received.

29. The augmented reality enabled device of claim 28, wherein the wireless signals are received by the ARD from an RFID tag attached to at least one object in the second set of the plurality of objects.

30. The augmented reality enabled device of claim 28, wherein the wireless signals comprise at least one of near field communication signals and Bluetooth signals.

31. The augmented reality enabled device of claim 28, wherein the background comprises a mat including one or more sensors configured to detect the relative positions of the plurality of objects, and wherein the information is indicative of the relative positions of the plurality of objects detected by the one or more sensors.

32. The augmented reality enabled device of claim 28, wherein the information is received at a processor or chip integrated into the ARD based on the wireless signals being received at the ARD.

33. The augmented reality enabled device of claim 21, further comprising:
   logic configured to track at least one object in the second set of the plurality of objects out of view of the ARD;
   logic configured to determine the at least one object in the second set of the plurality of objects still exists; and
   logic configured to render at least one of sound and graphics in a position of the at least one object in the second set of the plurality of objects.

34. The augmented reality enabled device of claim 21, further comprising:
   logic configured to cease to track a first object in the second set when the ARD is panned to a location where the first object is expected to be located and it is determined that the first object is not present at the location; and
   logic configured to cease an audio augmentation associated with the first object.

35. The augmented reality enabled device of claim 21, further comprising:
   logic configured to cease to track a first object in the second set when a new scene is detected; and
   logic configured to cease an audio augmentation associated with the first object.

36. The augmented reality enabled device of claim 21, wherein logic configured to render augmentation comprises:
   logic configured to render sound and graphics in a position when an indication of confidence of the states of the plurality of objects meets a first predetermined value;

logic configured to render sound in the position when the indication of confidence of the states of the plurality of objects meets a second predetermined value;

logic configured to render an ambient sound in the position when the indication of confidence of the states of the plurality of objects meets a third predetermined value;

logic configured to render a fading out transition in the position when the indication of confidence of the states of the plurality of objects meets a fourth predetermined value; or some combination thereof.

37. The augmented reality enabled device of claim 21, wherein the plurality of objects are game pieces and the background is a game board.

38. The augmented reality enabled device of claim 21, wherein the states of the plurality of objects comprise:

relational information of the plurality of objects with respect to each other;

relational information of the plurality of objects with respect to the background;

geometrical relationships of the plurality of objects with respect to each other;

geometrical relationships of the plurality of objects with respect to the background; or some combination thereof.

39. The augmented reality enabled device of claim 21, further comprising:

logic configured to track the plurality of objects and the background with multiple augmented reality enabled devices (ARDs);

logic configured to maintain states of the plurality of objects across the multiple ARDs; and logic configured to provide data for rendering augmentations in the multiple ARDs in response to the states of the plurality of objects.

40. The augmented reality enabled device of claim 21, wherein the background comprises:

a mat;

a wall; or some combination thereof.

41. A non-transitory medium storing instructions for execution by one or more computer systems, the instructions comprising:

instructions for tracking a plurality of objects and a background based at least in part on visual information derived from an image;

instructions for maintaining states of the plurality of objects, wherein the instructions for maintaining states of the plurality of objects comprises instructions for maintaining states of a first set of the plurality of objects in view of the ARD and instructions for maintaining states of a second set of the plurality of objects out of view of the ARD;

instructions for providing data for rendering augmentation in response to the states of the plurality of objects;

instructions for tracking at least one object in the second set of the plurality of objects out of view of the ARD;

instructions for determining the at least one object in the second set of the plurality of objects no longer exists; and instructions for rendering at least one of a fading out transition and an ambient sound in a position of the at least one object in the second set of the plurality of objects.

42. A system, comprising:

means for tracking a plurality of objects and a background based at least in part on visual information derived from an image;

means for maintaining states of the plurality of objects, wherein the means for maintaining states of the plurality of objects comprises means for maintaining states of a first set of the plurality of objects in view of the ARD and means for maintaining states of a second set of the plurality of objects out of view of the ARD;

means for providing data for rendering augmentation in response to the states of the plurality of objects;

means for tracking at least one object in the second set of the plurality of objects out of view of the ARD;

means for determining the at least one object in the second set of the plurality of objects no longer exists; and means for rendering at least one of a fading out transition and an ambient sound in a position of the at least one object in the second set of the plurality of objects.

* * * * *